US 6,741,250 B1

(12) United States Patent
Furlan et al.

(10) Patent No.: US 6,741,250 B1
(45) Date of Patent: May 25, 2004

(54) METHOD AND SYSTEM FOR GENERATION OF MULTIPLE VIEWPOINTS INTO A SCENE VIEWED BY MOTIONLESS CAMERAS AND FOR PRESENTATION OF A VIEW PATH

(75) Inventors: John L. W. Furlan, Belmont, CA (US); Edward C. Driscoll, Jr., Portola Valley, CA (US); Robert G. Hoffman, Fremont, CA (US); Derek Fluker, San Jose, CA (US); Karen L. Bechtel, San Jose, CA (US); Katerina L. Shiffer, Milpitas, CA (US); Venugopal Garimella, Sunnyvale, CA (US); Daniel B. Curtis, Newark, CA (US)

(73) Assignee: Be Here Corporation, Fremont, CA (US)

( * ) Notice: Subject to any disclaimer, the term of this patent is extended or adjusted under 35 U.S.C. 154(b) by 393 days.

(21) Appl. No.: 09/982,614

(22) Filed: Oct. 17, 2001

Related U.S. Application Data

(60) Provisional application No. 60/288,396, filed on May 2, 2001, and provisional application No. 60/267,538, filed on Feb. 9, 2001.

(51) Int. Cl.[7] .............................. G06T 15/00
(52) U.S. Cl. ..................................... 345/427
(58) Field of Search ................. 345/419, 427, 345/428, 473, 619, 581, 582

(56) References Cited

U.S. PATENT DOCUMENTS

| | | | | |
|---|---|---|---|---|
| 5,748,768 A | * | 5/1998 | Sivers et al. | 382/130 |
| 5,974,521 A | * | 10/1999 | Akerib | 712/11 |
| 6,381,072 B1 | * | 4/2002 | Burger | 359/622 |
| 6,590,606 B1 | * | 7/2003 | Hiller et al. | 348/203 |

* cited by examiner

*Primary Examiner*—Phu K. Nguyen
(74) *Attorney, Agent, or Firm*—Bever, Hoffman & Harms, LLP; Edward S. Mao

(57) ABSTRACT

Methods and apparatus for defining a view path through at least one wide-angle video stream and for creation of a resultant unwarped video stream responsive to the view path. Aspects of the invention allow an operator to monitor the wide-angle video stream(s) and select which portion of the wide-angle frame to unwarp in real-time. Further, the operator can stop the playback of the wide-angle video stream and dwell within a particular wide-angle frame to create special effects such as camera tilt, pan and zoom operations in a stop action situation.

56 Claims, 21 Drawing Sheets

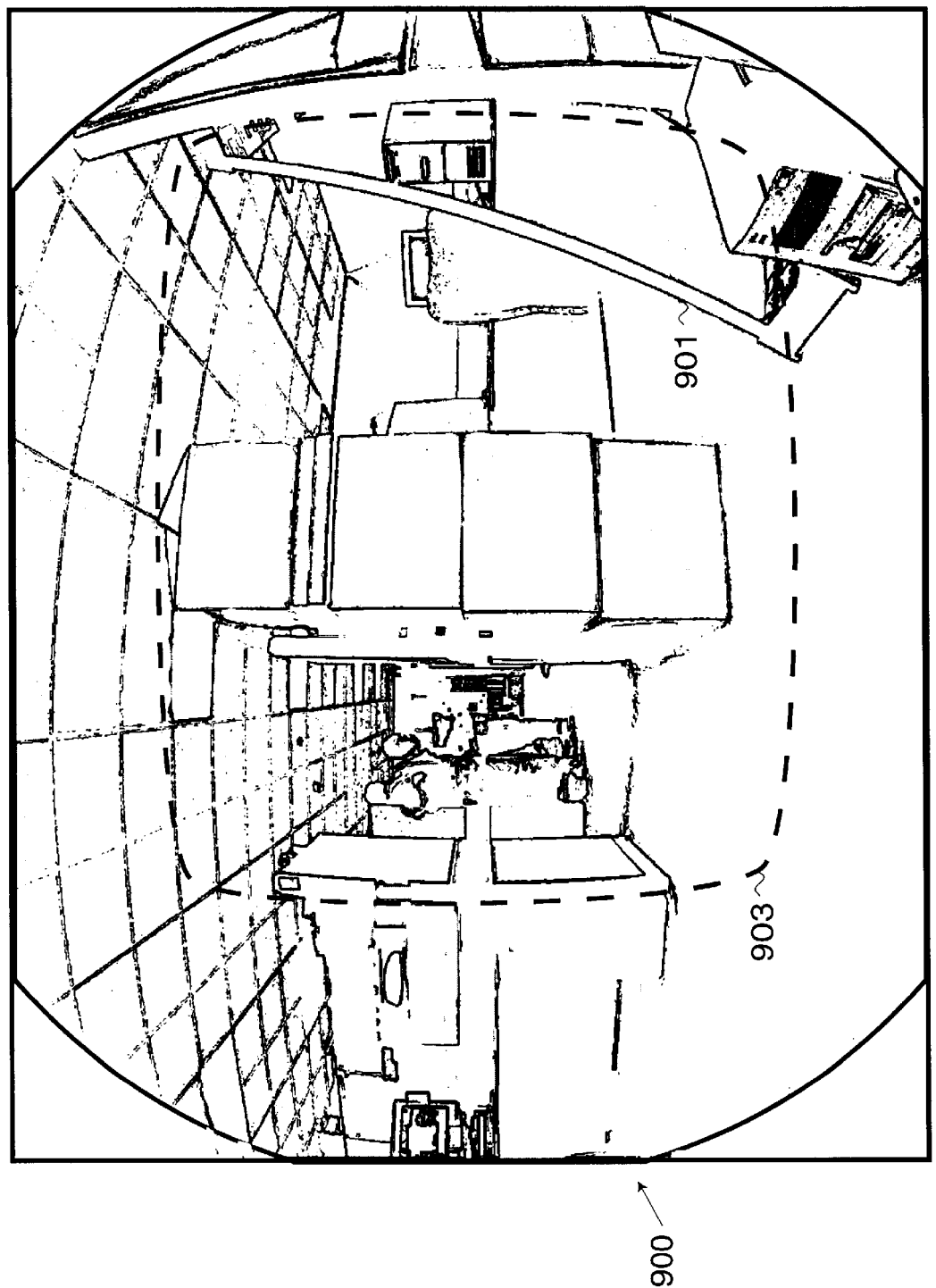

METHOD AND SYSTEM FOR GENERATION OF MULTIPLE VIEWPOINTS INTO A SCENE VIEWED BY MOTIONLESS CAMERAS AND FOR PRESENTATION OF A VIEW PATH

CROSS REFERENCE TO RELATED PATENT APPLICATIONS

This patent application is related to the following copending, commonly assigned patent application:

Method and System for Generation of Multiple Viewpoints into a Scene Viewed by Motionless Cameras by, John L. W. Furlan and Edward C. Driscoll Jr., filed on Oct. 17, 2001, Ser. No. 09/982,451

This application claims priority from U.S. Provisional Patent Application No. 60/267,538, filed Feb. 9, 2001 and entitled Method and System for Generation of Multiple Viewpoints into a Scene Viewed by Motionless Cameras.

This application also claims priority from U.S. Provisional Patent Application No. 60/288,396, filed May 2, 2001 and entitled Method and System for Generation of Multiple Viewpoints into a Scene Viewed by Motionless Cameras and for Presentation of a View Path.

BACKGROUND OF THE INVENTION

1. Field of the Invention

This invention relates to the field of video image processing.

2. Background

It is known in the art how to use multiple video cameras to capture multiple viewpoints of a scene and to either select a desired video viewpoint of the scene or to recreate a desired video viewpoint from a model of the scene (the model created from information gathered by the captured multiple viewpoints of the scene) (see, for example, U.S. Pat. No. 5,745,126 entitled Machine synthesis of a virtual video camera/image of a scene from multiple video cameras/images of the scene in accordance with a particular perspective on the scene, an object in the scene, or an event in the scene, by Jain et al. and U.S. Pat. No. 5,850,352 entitled Immersive video, including video hypermosaicing to generate from multiple video views of a scene a three-dimensional video mosaic from which diverse virtual video scene images are synthesized, including panoramic, scene interactive and stereoscopic images, by Moezzi et al.) However, these patents teach maintaining a computerized model of the scene and require very significant computer processing (even with respect to circa 2001 computers) to maintain the model and to generate real-time images from the model.

In addition, U.S. patent application Ser. No. 09/659,621 discloses technology for tracking an object in a warped video image.

It is also known in the art how to use multiple video cameras to capture images from a plurality of viewpoints into the scene and to assemble some of these images to provide apparent motion of the viewers viewpoint around an area-of-interest in the scene. This technology was displayed during the telecast of the Superbowl XXXV played on January of 2001 in Tampa Fla. (EyeVision™ video provided by CBS Sports and Core Digital Technologies).

It is known in the art how to capture a distorted image of the scene (for example, by using a wide-angle lens or a fish-eye lens) and to transform an area-of-interest of the captured distorted image into a non-distorted view. This allows a viewer to specify the area-of-interest of the distorted image that the viewer desires to view thus providing the viewer with pan, tilt, and zoom (PTZ) operations that can be applied to the distorted image. Thus, a viewer can apply pan, tilt, and zoom onto the distorted image during the transformation so as to provide a view into the scene that is substantially the same view as that provided by a camera/lens that includes a remote controlled pan, tilt, and/or zoom capability (see for example, U.S. Pat. No. Reissue 36,207, entitled Omniview Motionless Camera Orientation System, by Zimmerman et al.).

U.S. patent application Ser. No. 08/872,525, entitled Panoramic Camera provides an example of the use of a catadioptric lens to capture a distorted image containing the area-of-interest.

It is also known in the art how to optimize the transformation process to provide high quality real-time video (see for-example, U.S. Pat. No. 5,796,426, entitled Wide-Angle Image Dewarping Method and Apparatus, by Gullichsen et al.).

One disadvantage of the EyeVision technology is that it uses remotely controlled moveable cameras to provide the pan, tilt and zoom functions required to keep the cameras on at least one area-of-interest of the scene that is to be viewed from the viewpoint of the camera. Because the camera must move to track the area-of-interest of the scene as the scene evolves over time, the camera must have the capability to perform the pan, tilt, and zoom operations sufficiently rapidly to keep the area-of-interest of the scene in the field of view of the camera/lens combination. This requirement increases the cost and size of the remotely controlled camera and dictates how close the camera/lens combination can be placed to the scene. In addition, as the camera/lens combination is placed further from the scene, the point of view captured by the camera (even with zoom) is that view from a more distant location than the view from a camera that is up-close to the scene.

It would be advantageous to use stationary camera/lens combinations to capture the video images of the scene that do not require mechanical actuators to pan, tilt or zoom to track the area-of-interest of the scene. In addition, it would be advantageous to use a camera/lens combination that would allow placement of the camera/lens combination close to a rapidly moving area-of-interest.

One of the problems in sports broadcasting or any other type of broadcasting where unexpected actions can occur (for example, in live news or event coverage) is that these unexpected actions often occur outside the field of view of any camera. Another difficulty is that a video segment or instant replay generally must be from a single camera. This limits the footage that is available for a commentator to discuss.

Another problem with the prior art is that the commentator cannot change the video segment that is available to him/her and is limited to discussing the view provided by the available video segment. This reduces the commentator's ability to provide spontaneous, interesting and creative commentary about the action.

Thus, it would be advantageous to provide a system that reduces the amount of lost action and that allows a commentator to specify and/or change the view into the action during the commentary of the video segment.

SUMMARY OF THE INVENTION

Aspects of the present invention provide for the specification of a view path through one or more video segments. The view-path so defined then is used to determine which video frames in the video segments are used to generate a view. The video frames can include a wide-angle distorted image and the view path need not cause the display of the entire video frame. In addition, the view path can dwell in a particular video frame to provide pan, tilt, and zoom effects on portions of the video frame. Furthermore, the view-path can jump between video segments to allow special affects (for example, but not limited to) revolving the presented viewpoint around the area-of-interest.

The foregoing and many other aspects of the present invention will no doubt become obvious to those of ordinary skill in the art after having read the following detailed description of the preferred embodiments that are illustrated in the various drawing figures.

DESCRIPTION OF THE DRAWINGS

FIG. 9 illustrates a wide-angle video frame in accordance with a preferred embodiment.

DESCRIPTION OF THE PREFERRED EMBODIMENTS

Notations and Nomenclature

The following 'notations and nomenclature' are provided to assist in the understanding of the present invention and the preferred embodiments thereof.

Procedure—A procedure is a self-consistent sequence of computerized steps that lead to a desired result. These steps are defined by one or more computer instructions. These steps can be performed by a computer executing the instructions that define the steps. Thus, the term "procedure" can refer (for example, but without limitation) to a sequence of instructions, a sequence of instructions organized within a programmed-procedure or programmed-function, or a sequence of instructions organized within programmed-processes executing in one or more computers. Such a procedure can also be implemented directly in circuitry that performs the steps.

Overview

One aspect of the invention is an improvement to the methods, apparatus, and systems that are used to select a viewpoint of a video stream of an area-of-interest of a scene.

Prior Art

Figure 1:
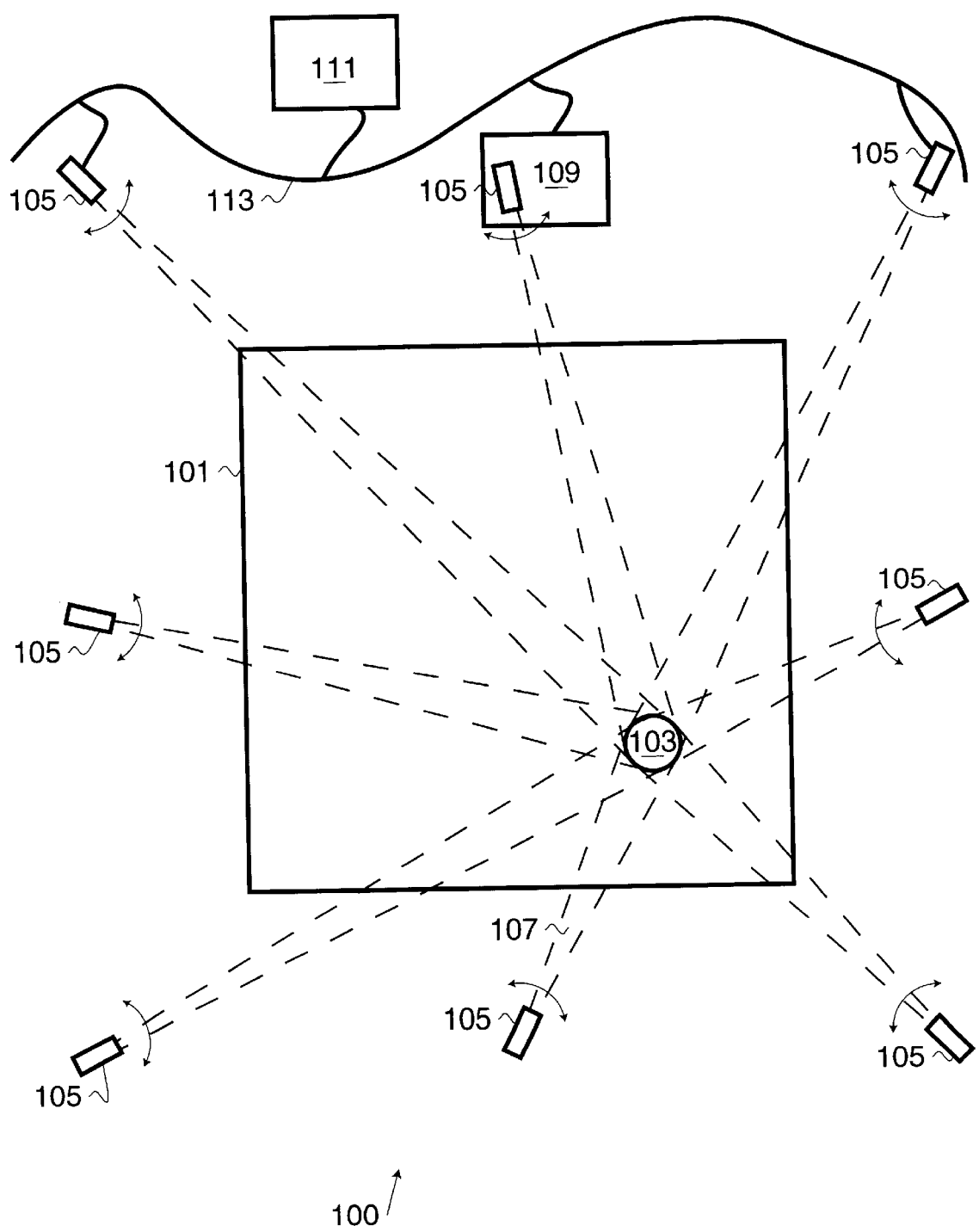
FIG. 1 illustrates a multiple moveable camera configuration for capturing a view of interest known to the prior art.

FIG. 1 illustrates a multiple moveable camera configuration 100 having a defined scene 101 within which exists at least one area-of-interest 103 that is tracked by at least some of moveable cameras 105. Each of the moveable cameras 105 has a field-of-view 107 that may or may not be the same field of view as that of another of the moveable cameras 105. As the area-of-interest 103 moves within the defined scene 101, some of the moveable cameras 105 move (for example, they pan, tilt, and/or zoom) to keep the area-of-interest 103 within the field-of-view 107 of each of the moveable cameras 105 that follow the area-of-interest 103. One skilled in the art will understand that while the pan and tilt movements use actual movement of the camera, the zoom function is either a movement of a lens element, and/or an electronic zoom applied to the image received by the camera through a fixed lens. Because each of the moveable cameras 105 are in different locations with respect to the area-of-interest 103 the moveable cameras 105 provide a plurality of different spatial viewpoints of the area-of-interest 103.

The camera movement is performed by mechanical means (such as by a robotic actuator 109 shown with one of the moveable cameras 105). The movements of the moveable cameras 105 can be synchronized by an operator providing input to a computerized controller 111 (or a tracking program in communication with the computerized controller 111) that uses a network 113 to communicate the pan, tilt and zoom parameters to the robotic actuator 109 of each of the moveable cameras 105 to position at least some of the moveable cameras 105 to follow and capture a video image of the area-of-interest 103 as the area-of-interest 103 moves through the defined scene 101. By selecting a specific moveable camera, or by selecting frames from each of the moveable cameras 105, a video representation of the area-of-interest 103 can be selected/created.

Some of the disadvantages of the prior art are that mechanical actuator mechanisms are expensive, delicate, require sufficient unobstructed space around the camera so as to move the camera and lens, are large enough to obstruct a viewer's view into the defined scene 101 (if the camera is between the viewer and the area-of-interest 103), and are unable to follow the area-of-interest 103 if it moves sufficiently rapidly through the defined scene 101.

In addition, it is very difficult to synchronize each of the moveable cameras and to align the images from the cameras. The mechanical aspects of the PTZ cameras result in small mismatches in the view received by each of the cameras. This mismatch requires that (for some special effects such as the viewpoint pan) the video processor (or computer) that receives the frames from each of the cameras must align and otherwise connect the frames. In addition, vibrations (such as environmental vibrations and/or vibrations of the operation of the PTZ camera) often cause the mechanical features to become out of alignment.

Another disadvantage with PTZ cameras is that to track a rapidly moving area-of-interest 103 these cameras must be placed sufficiently far from the scene so that the area-of-interest stays within the field of view of the PTZ camera as it moves. This placement of the camera far from the scene limits the ability to provide an "up-close" viewpoint of the area-of-interest even with zoom. For example, the difference in effect is that of watching an approaching locomotive from 5 feet away from the track as compared to watching the locomotive from 500 feet from the track with 100× binoculars. Furthermore, the noise and motion of a PTZ camera can be distracting when placed close to the scene.

For clarity, FIG. 1 shows only one of the robotic actuators as being connected to the network 113. In general, the robotic actuators for each of the moveable cameras 105 are connected to the network 113 by wire or wireless means.

Detailed Description

One aspect of the invention is an improvement to the multiple moveable camera configuration 100 shown in FIG. 1. This improvement uses a novel combination of existing technologies to address the problems previously discussed with respect to FIG. 1 (as well as other problems).

Figure 2:
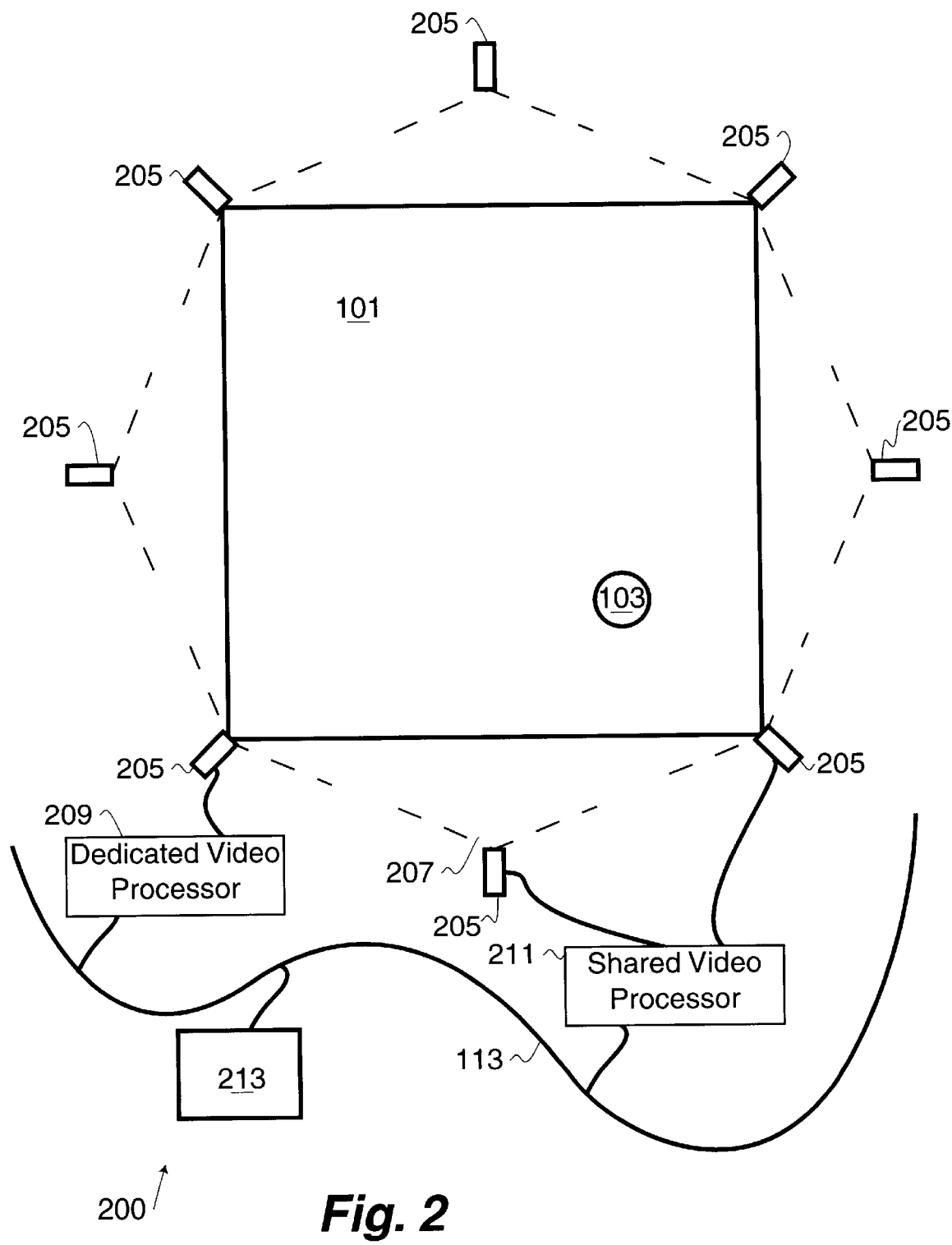
FIG. 2 illustrates a symmetrical stationary-camera configuration for capturing a view of interest in accordance with a preferred embodiment.

FIG. 2 illustrates a symmetrical stationary-camera configuration 200 as applied to the defined scene 101. In the symmetrical stationary-camera configuration 200, the area-of-interest 103 is tracked by stationary cameras 205 each having a field-of-view 207. The field-of-view 207 is sufficiently wide such that the entirety of the defined scene 101 is within the field-of-view 207. Using this configuration, the area-of-interest 103 is always within the field-of-view 207 of each of the stationary cameras 205. Each of the stationary cameras 205 is connected to either a dedicated video processor 209 or a shared video processor 211 that are in turn connected to a computerized controller 213 by the network 113. For clarity, not all of the network connections nor are all of the camera-to-video processor connections shown in FIG. 2. In some embodiments, the dedicated video processor 209 can be included inside the camera. The video stream can also be captured either by the dedicated video processor 209 (internal or external to the camera) or the shared video processor 211 can be locally stored for later retrieval.

The network 113 can be an optical fiber network, an Ethernet, a star network, a multiplexed network etc. so long as the needed bandwidth and distance requirements are met.

At least some of the stationary cameras 205 use a distorting lens (for example, a wide-angle lens or a catadioptric lens) to capture a sufficiently wide field-of-view. The video frames containing such wide-angle video views make up a distorted video stream.

Using technology similar to that disclosed by Zimmerman et al. in U.S. Pat. No. Reissue 36,207, a portion of each video frame of the distorted video stream captured by any particular camera of the stationary cameras 205 could be transformed in the dedicated video processor 209 or the shared video processor 211 to generate a non-distorted image of the portion of the distorted video stream frame that contains the area-of-interest 103. However, the techniques disclosed by Zimmerman are not fast enough to maintain an acceptable video frame rate in real-time unless expensive specialized dedicated hardware or extremely fast computers are used.

In comparison to Zimmarman, techniques disclosed by Gullichsen et al. in U.S. Pat. No. 5,796,426 allow high-speed transformations while still maintaining high image quality. By using the techniques disclosed in Gullichsen et al., a high quality undistorted image of the area-of-interest 103 can be produced sufficiently quickly to support a video representation of the area-of-interest 103 in real-time.

Thus, each of the stationary cameras 205 captures a distorted image containing the area-of-interest 103. The portion of the distorted image containing the area-of-interest 103 (in one embodiment, as specified to the video processor associated with the camera by the computerized controller 213) is then transformed by the video processor, at video frame rates, to generate a video frame containing a non-distorted image of the area-of-interest 103. These video frames (that are equivalent to video frames generated by any of the moveable cameras 105) can then be processed using prior art techniques to provide a video representation of a user-specified viewpoint of the area-of-interest 103 or to provide special effects that utilize the availability of multiple viewpoint video streams of the area-of-interest 103 to create a video representation.

One skilled in the art will also understand that the video processors 209, 211 can self determine the viewpoint by tracking particular portions of the area-of-interest 103 and communicate the self-determined viewpoint to the computerized controller 213.

The symmetrical stationary-camera configuration 200 also provides the ability to provide "instant replay" capability where the "instant replay" is from a different viewpoint into the defined scene 101 than the viewpoint provided by the live sequence. Because the entirety of the defined scene 101 is captured in every video frame (and in this instance, recorded at the dedicated video processor 209 or the shared video processor 211), views of areas of the defined scene 101 can be provided that were found to be of interest after the "live" representation of the initial area-of-interest was provided. Thus, allowing "instant replay" capability from unexpected viewpoints into unexpected areas-of-interest. For smooth, around-the-object tracking (without the use of a computer model), the cameras should be placed with a suitably small angular difference from the scene (such as 20-degrees or less).

In addition, the area-of-interest 103 can be automatically tracked as it moves through the defined scene 101 by using a distorted image with techniques such as those disclosed in U.S. patent application Ser. No. 09/659,621. For example, the dedicated video processor 209 or the shared video processor 211 can also execute image tracking programs that determine when a portion of the area-of-interest 103 is facing the stationary camera attached to the image processor.

Thus, for the example of boxing, the video processors can communicate to the computerized controller 213 whether or not a (and which) tracked object is facing a particular camera. The computerized controller 213 can then automatically determine which set of camera video streams is to be used to generate the resultant video stream.

FIG. 2 shows each of the stationary cameras 205 as being placed equidistant around the defined scene 101 and with the field-of-view 207 being substantially identical. This arrangement allows production of video images that are of comparable resolution and that can be similarly processed. However, some preferred embodiments can use non-equidistant camera positions and cameras having different field of views.

One advantage of using stationary cameras where each frame from the stationary cameras captures significantly more of the defined scene 101 than just the area-of-interest 103, is that the synthesis of virtual viewpoints between cameras is significantly easier and much less prone to frame alignment errors as compared to traditional video synthesis. As discussed herein, this simplifies generating a fluid viewpoint pan around the area-of-interest 103. Another advantage of using stationary cameras is that synthesizing a viewpoint between the cameras is simpler because significantly more coverage of the area of the scene surrounding the area-of-interest is captured by each camera (thus, providing more overlap in the data taken by the stationary cameras 205). Furthermore, it is simpler to correct for camera mis-alignment and vibration artifacts as these corrections can be accomplished by correcting the generated view to compensate for the mis-alignment or vibration. Thus, complex three-dimensional modeling of the scene is not needed to provide acceptable quality output video stream from the multiple cameras.

The computerized controller 213 generates a video stream for presentation. This presentation can be by display on a television monitor, by storage of the video stream, or by communication of the video stream to the video input of some other device. There can also be a multiple of the computerized controller 213 each providing independent views of the area-of-interest 103.

In addition, while one preferred embodiment has the transformation steps performed at the video processors 209, 211, other preferred embodiments have the distorted images sent from a selected video processor and the transformations performed by the computerized controller 213. This embodiment centralizes the increased processing power required for the transformations while simplifying the requirements on the video processors 209, 211 and can reduce the amount of network traffic.

Figure 3:
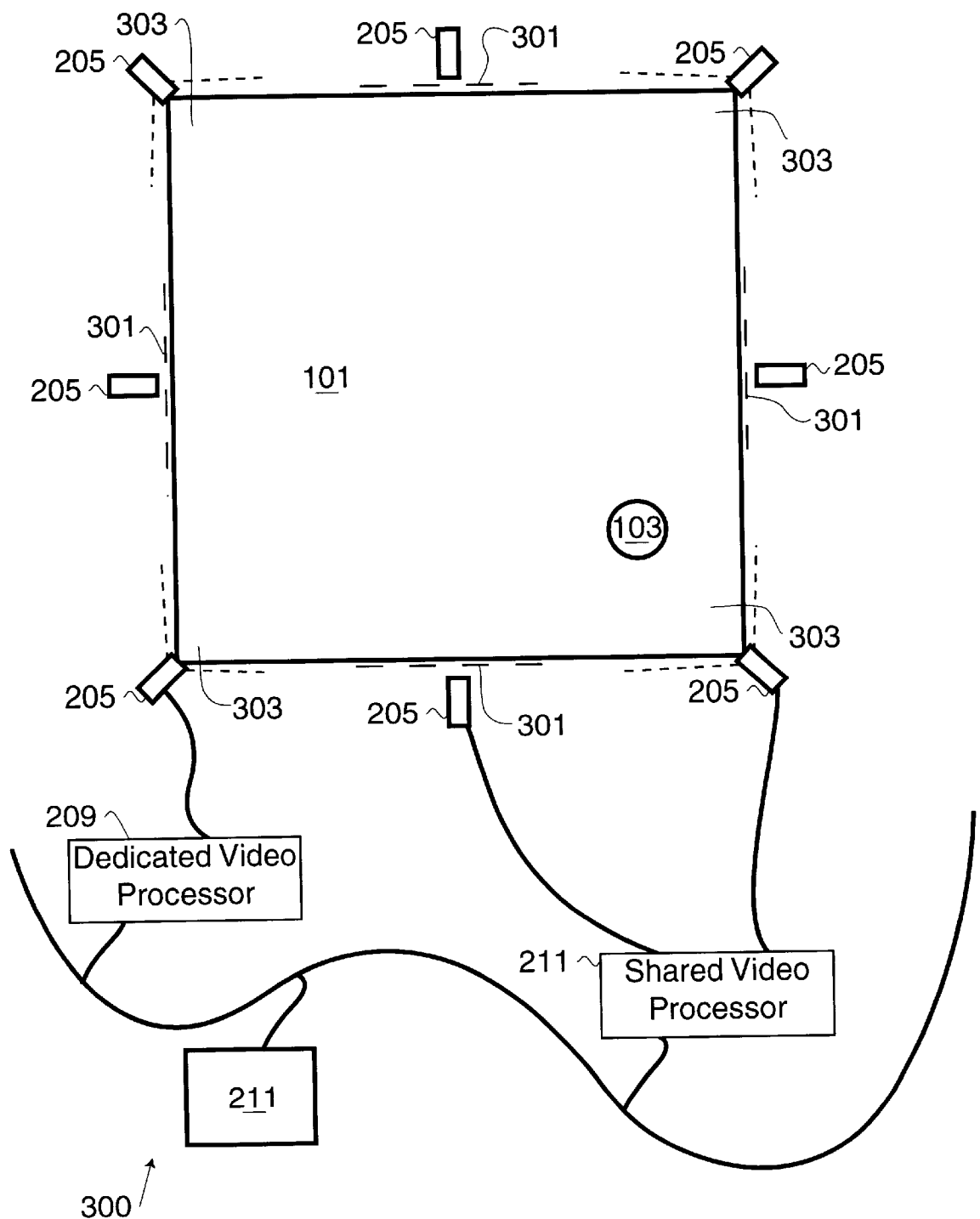
FIG. 3 illustrates an asymmetrical stationary-camera configuration for capturing a view of interest in accordance with a preferred embodiment.

FIG. 3 illustrates an asymmetrical stationary-camera configuration 300 where some of the stationary cameras 205 have a first field of view 301 that is very wide (for example, 180 degrees) and others of the stationary cameras 205 have a second field of view 303 (for example, 100 degrees) that is different from the first field of view 301. The video processors are configured accordingly. If the cameras have the same resolution but have differing field-of-views, the resulting transformed views in the video representation of the area-of-interest 103 will have different resolutions. This aspect can be mitigated by using higher resolution cameras to capture the wider field of view.

Figure 4A:
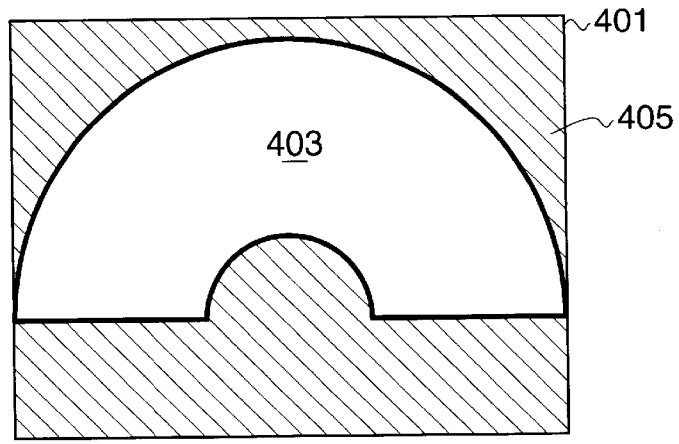
FIG. 4A illustrates placement of a 180 degree partial annular image as collected by a digital imager in accordance with a preferred embodiment.
Figure 4B:
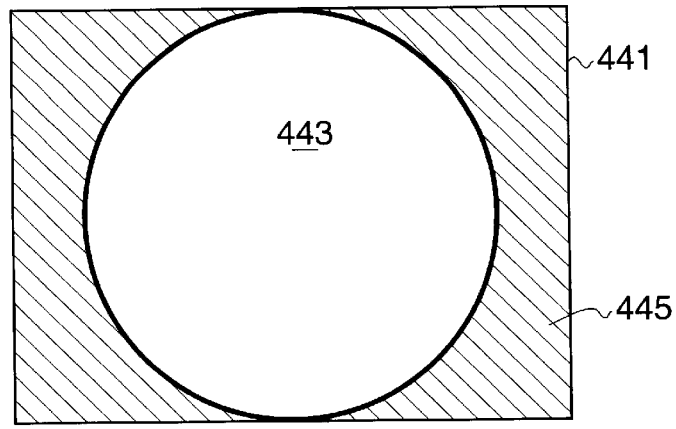
FIG. 4B illustrates placement of a conical image as collected by a digital imager in accordance with a preferred embodiment.
Figure 4C:
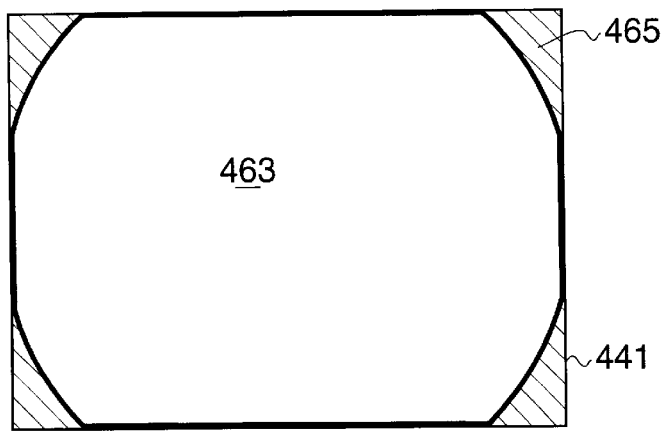
FIG. 4C illustrates placement of a truncated conical image as collected by a digital imager in accordance with a preferred embodiment.

FIG. 4A though FIG. 4C illustrate a sample of some of the possible ways to image annular or conical images on an electronic imaging surface (for example a CCD or CMOS image sensor).

FIG. 4A illustrates an image placement configuration 400 having a digital imager 401 within a camera upon which a partial annular image 403 is positioned by the camera and catadioptric lens optics. An unused imager portion 405 is the portion of the digital imager 401 outside the partial annular image 403. The characteristics and advantages of an annular image are described in U.S. patent application Ser. No. 08/872,525.

FIG. 4B illustrates an image placement configuration 440 using a digital imager 441 within a camera upon which a conical image 443 is positioned by the camera and conical lens optics. An unused imager portion 445 is the portion of the digital imager 441 outside the conical image 443.

FIG. 4C illustrates an image placement configuration 460 using the digital imager 441 within a camera upon which a truncated conical image 463 is positioned by the camera and conical lens optics. A portion of the truncated conical image 463 falls off of the digital imager 441. However, the lost portion of the truncated conical image 463 is offset by the increased resolution of the image and the reduction of an unused imager portion 465 as compared to the unused imager portion 445.

Figure 5:
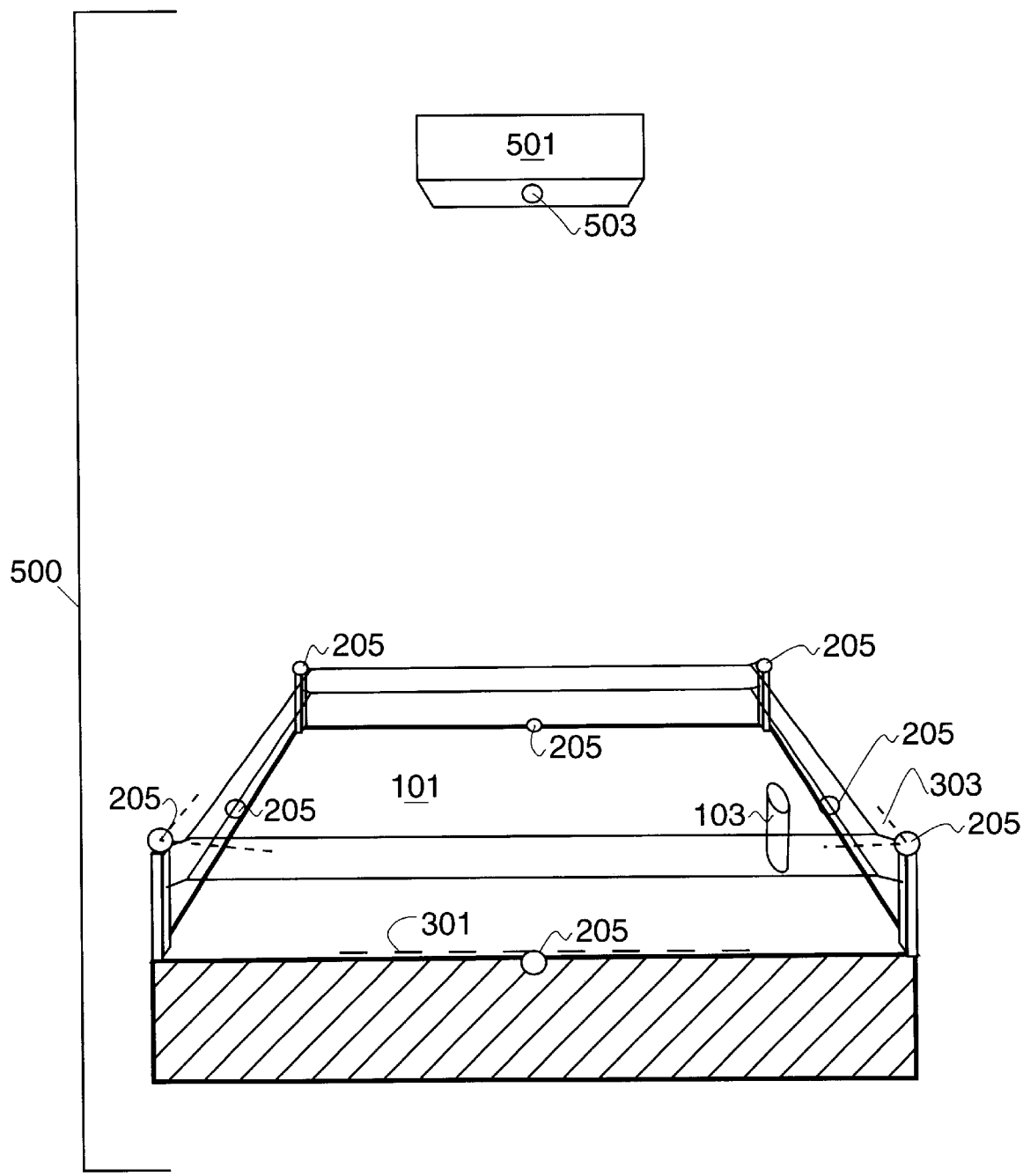
FIG. 5 illustrates a first camera configuration for a playing area used as the defined scene in accordance with a preferred embodiment.

FIG. 5 illustrates a first camera configuration for a sports ring 500 using the asymmetrical stationary-camera configuration 300 of FIG. 3. In this configuration, the defined scene 101 is the volume at and extending above the surface of the sports ring (for example, a boxing or wrestling ring). The stationary cameras 205 are distributed about the defined scene 101 at differing heights (some of the cameras are on the ring posts, others on the floor of the ring). The stationary cameras on the floor of the ring are configured to capture a 90-degree wide band of light that extends from the floor of the ring to the rope boundary and with the band of light extending for 180 degrees along the edge of the floor (as indicated by the first field of view 301). The band of light captured using a catadioptric lens is disclosed in U.S. patent application Ser. No. 08/872,525. Such a lens may be tilted so that the lens' horizon line extends upward into the volume and the band of captured light extends from the ring floor to the ropes (thus capturing the entire ring from the mat to the ropes). This arrangement improves gathering of information for texture mapping a computerized model of the scene. Another use of the first camera configuration for a sports ring 500 is to provide a view-point transformation on the data captured from each camera to allow a smooth transition between cameras.

The cameras on the ring posts capture the second field of view 303 that is substantially a 90-degree conical field of view.

Views of the area-of-interest 103 from the viewpoints of these cameras can be selected to provide the video representation with a desired viewpoint. In addition, these views can be used as input to a computer model of the sports ring so that the model can create the video representation with the desired viewpoint even when the area-of-interest 103 is not captured from the desired viewpoint (although the area-of-interest 103 generally does need to be captured by some camera).

Often the sports ring has an elevated support structure 501 such as a JumboTron® or elevated lighting structure that can include a tracking camera 503. The tracking camera 503 can be a movable camera or a stationary camera and can be used to simplify the process of tracking the area-of-interest 103 (either by an operator or by a computerized program monitoring the area-of-interest 103 as it moves through the defined scene 101.

The sports ring is but one of a multitude of playing areas contemplated by the inventors. Some of the contemplated playing areas include sports courts such as a basketball, volleyball, hockey, swimming pool, or other sports court. In addition, the playing area can be a field such as a football field, a baseball diamond, a soccer field or similar indoor or outdoor playing field. For large area courts (for example, a golf course) the cameras can be placed around areas of known activity (for example, around a green or teeing ground). Furthermore, aspects of the disclosed technology can be used to monitor areas for security reasons with stationary cameras, to monitor a presentation, concert or similar event, or for providing video frames to generate special effects. In addition, the inventors contemplate using the invention to record an object in motion at a particular instant of time from multiple viewpoints.

Figure 6:
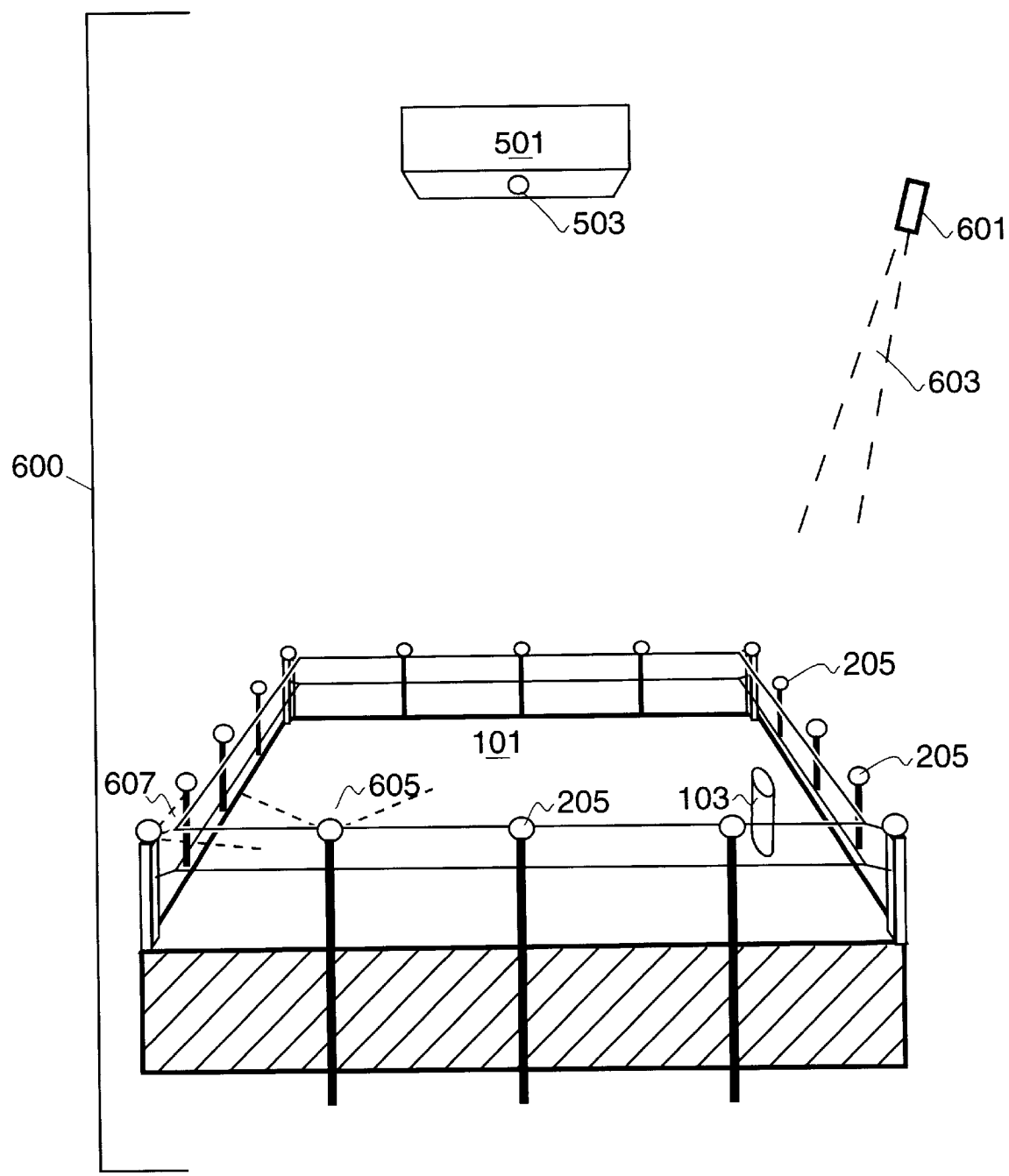
FIG. 6 illustrates a second camera configuration for a sports ring used as the defined scene in accordance with a preferred embodiment.

FIG. 6 illustrates a second camera configuration for a sports ring 600 where the stationary cameras 205 are all placed at the same level on the ring. In addition, a tracking camera 601 can be provided. The tracking camera 601 can be a moveable camera with a narrow or variable field-of-view 603 and that can be used to provide another viewpoint for tracking the area-of-interest 103 as it moves through the defined scene 101. The tracking camera 601 can also be a stationary camera having a field-of-view that includes the scene where the tracking of the area-of-interest 103 can be performed by an operator of automatically using a tracking process. The stationary cameras 205 can include a mixture of those with a wide field-of-view 605 and those with an intermediate field-of-view 607. Of course, each of the stationary cameras 205 can be configured to have the same field of view.

One advantage of the second camera configuration for a sports ring 600 is that it requires less computer processing on the video to generate the video representation with the viewer specified viewpoint of the area-of-interest 103 because the cameras have a similar vertical position. This characteristic also simplifies generation of special effects using portions of a number of the video streams of the area-of-interest 103.

Figure 7:
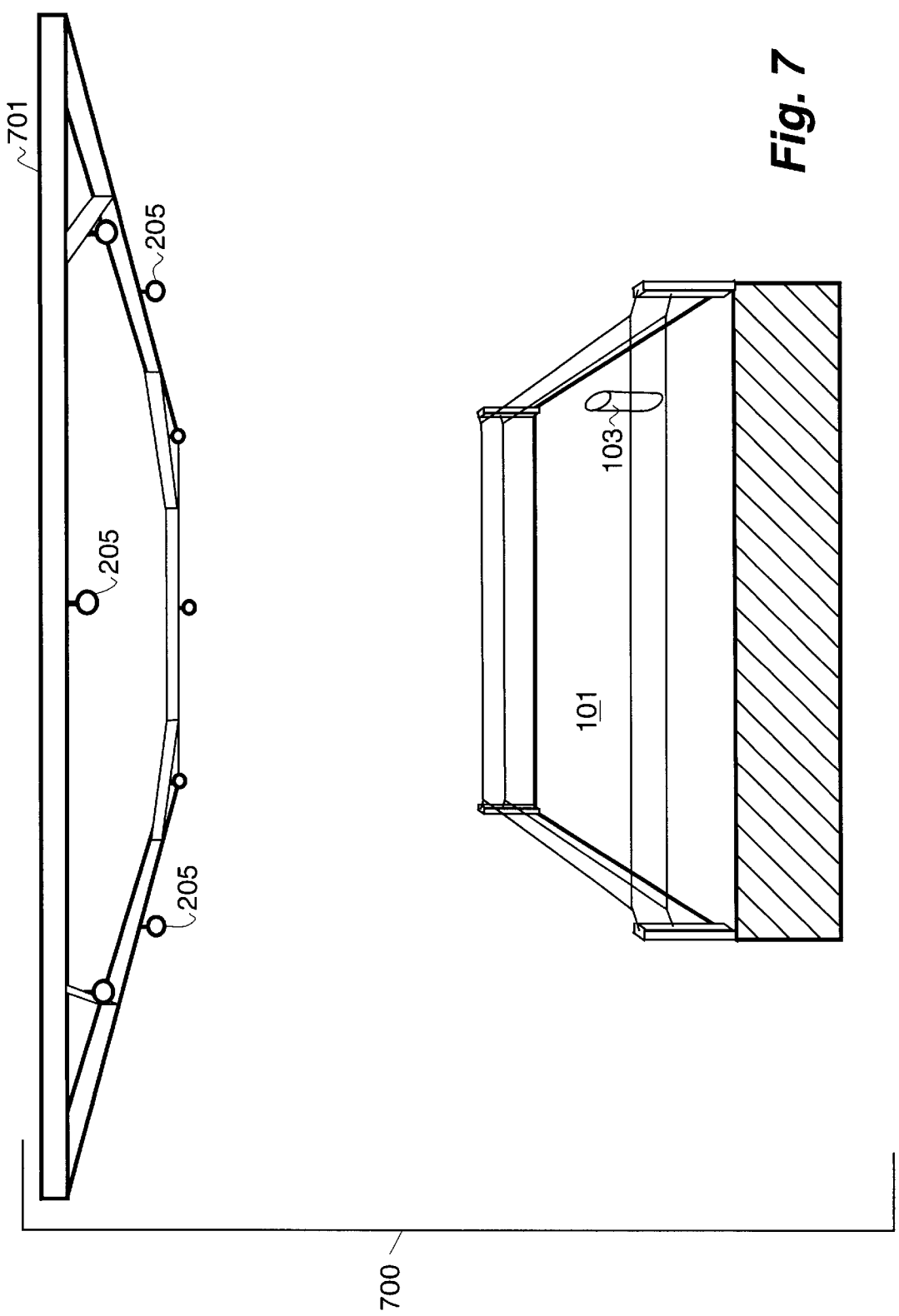
FIG. 7 illustrates a third camera configuration for a sports ring as the defined scene in accordance with a preferred embodiment.

FIG. 7 illustrates a third camera configuration for a sports ring 700 wherein the stationary cameras 205 are symmetrically located on a suspended equipment beam 701 that is above the defined scene 101 that contains the area-of-interest 103. One advantage of replacing moveable cameras with stationary cameras on the suspended equipment beam 701 is that the stationary cameras do not cause vibration of the suspended equipment beam 701 as do movable cameras as they track the area-of-interest 103. In addition, the stationary cameras 205 weigh less and require less space then do movable cameras.

Additional camera configurations include a "U" shaped or semi-circle configuration to capture the area-of-interest 103 at an interesting portion of the defined scene 101 (for example, this configuration would be useful when the defined scene 101 is a basketball court where most of the action occurs close to the baskets and not in the middle of the court).

In one embodiment, the area-of-interest 103 can be determined from the operation of the tracking camera 601. That is, by knowing the position and characteristics of each stationary camera, the position, pan, tilt, and zoom of the tracking camera, the system can provide the desired viewpoint to each of the controllers of the stationary cameras. Each controller can then generate the requested view of the area-of-interest 103.

In another embodiment, the area-of-interest 103 can be automatically tracked without the tracking camera 601. In this embodiment, movement is detected by each controller. Knowing the camera position, the lens characteristics, and the full image (for example, the distorted image, or the panoramic representation of the image) from at least two of the cameras, one of the camera controllers, a dedicated computer, or other device can triangulate the area-of-interest 103 from the movement (and the history of movement) in the scene.

In still another embodiment, a stationary overhead tracking camera can be used that has a field that covers the scene. As objects of interest move through the scene the tracking camera can determine where the area-of-interest 103 is within the scene and send information to the camera controllers for them to appropriately image the area-of-interest 103.

One skilled in the art would understand that the controllers can be provided with three-dimensional information that specifies the location of the area-of-interest 103. Each controller, knowing the three dimensional position of the area-of-interest 103 and the location of the camera(s) controlled by the controller, can generate a viewpoint(s) into the scene dependent on the camera location. Thus, each stationary camera receives an image that contains the area-of-interest 103. The three-dimensional information can also be developed from a 3D model of the movement.

Figure 8A:
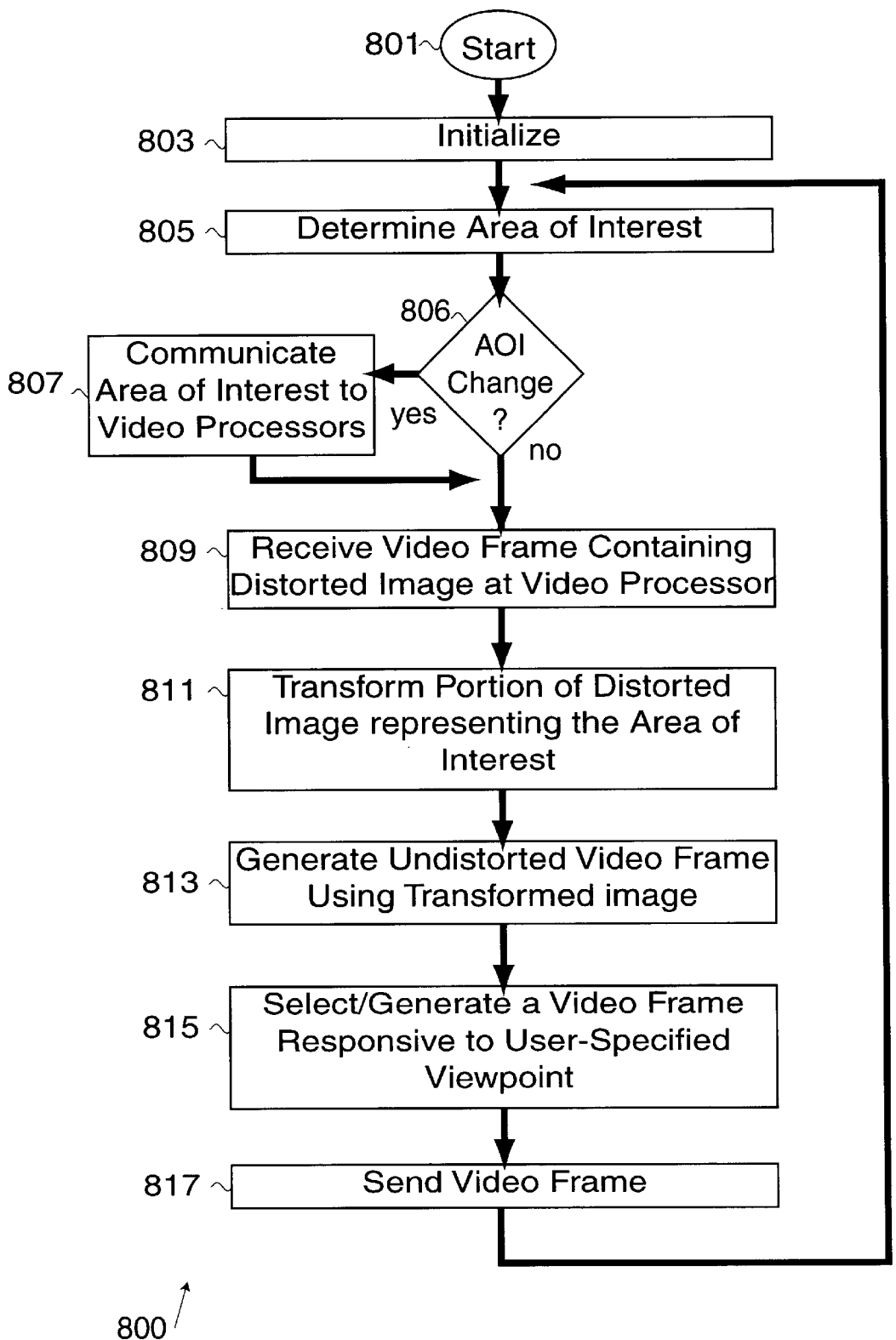
FIG. 8A illustrates a video creation process in accordance with a first preferred embodiment.

FIG. 8A illustrates a video creation process 800 that initiates at a 'start' terminal 801 and continues to an 'initialization' procedure 803 that performs any required initialization. The initialization can include entering or automatically determining the position of the stationary cameras (for example, with respect to the scene or to each other). After the video creation process 800 initializes, it continues to a 'determine area-of-interest' procedure 805 that determines what portion of the scene contained in the defined scene 101 is to be captured as the area-of-interest 103.

The 'determine area-of-interest' procedure 805 can be configured to receive input from an operator who designates the area-of-interest 103 or can use one or more tracking cameras (for example, the tracking camera 503 or the tracking camera 601) to automatically track the area-of-interest 103 using computerized tracking algorithms known in the art or as disclosed in U.S. patent application Ser. No. 09/659,621. In addition, video streams from two or more of the stationary cameras 205 can be used to triangulate the area-of-interest 103 as it moves through the scene.

Once the area-of-interest 103 is determined, a 'changed area-of-interest' decision procedure 806 determines whether the area-of-interest 103 has changed (for example if the area-of-interest 103 has moved or if an operator or tracking computer designated a different portion of the scene as the area-of-interest 103. If the area-of-interest 103 has changed, the video creation process 800 continues to a 'communicate area-of-interest' procedure 807 that communicates the changed area-of-interest 103 to the video processors (for example, from the computerized controller 213 to the dedicated video processor 209 or the shared video processor 211) that are configured to process the distorted video stream received from the stationary cameras 205 that view the scene. Each of the stationary cameras 205 has a different viewpoint of the scene.

The 'determine area-of-interest' procedure 805, the 'changed area-of-interest' decision procedure 806 and the 'communicate area-of-interest' procedure 807 can be configured to execute asynchronously (or synchronously) with the processing executing on the video processors such that when the area-of-interest 103 changes the change is communicated to the video processors and used for subsequent frame processing.

The change in the area-of-interest 103 can be communicated to video processors as position information (such as coordinates in the scene), by attributes of the portion of the scene that contains the area-of-interest 103 (such as a shape or color pattern), or by communicating other identification information that can be used to identify the area-of-interest 103.

Figure 8B:
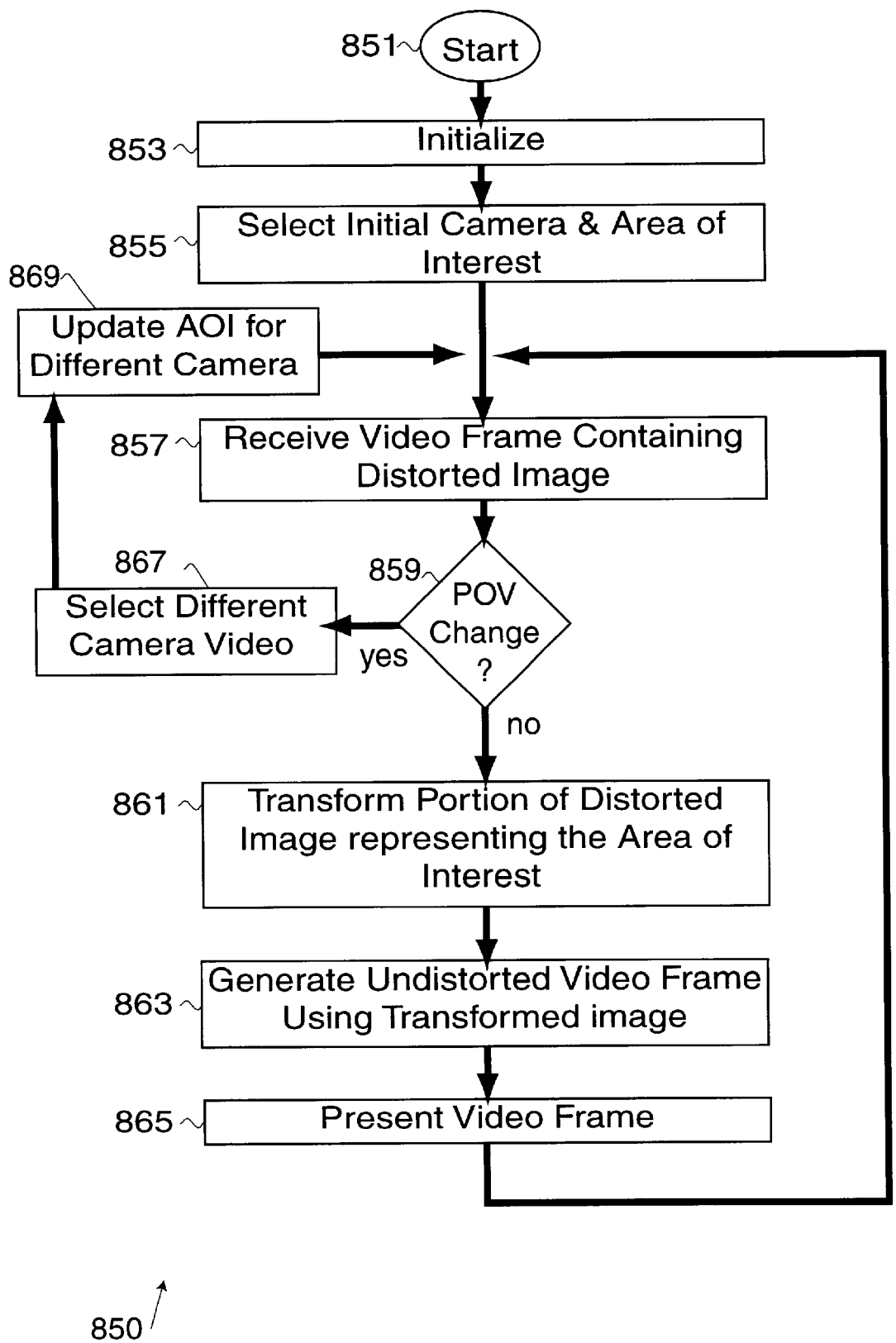
FIG. 8B illustrates a video creation process in accordance with a second preferred embodiment.

FIG. 8B illustrates a video creation process 850 that initiates at a 'start' terminal 851 and continues to an 'initialization' procedure 853 that performs any required initialization. The initialization can include entering or automatically determining the position of the stationary cameras (for example, with respect to the scene or to each other). After the video creation process 850 initializes, it continues to a 'select initial camera and area-of-interest' procedure 855. The 'select initial camera and area-of-interest' procedure 855 allows an operator to select the initial point-of view that contains the area-of-interest 103 (this is accomplished by selecting a video stream from a stationary camera). This procedure can also be accomplished automatically by tracking the motion in the scene and automatically selecting the point-of-view that meets specified criteria. Such criteria can include nearest motion, most active motion, least motion and other criteria known to one in the art.

A 'receive video frame' procedure 857 receives a video frame from the selected stationary camera corresponding to the selected point-of-view. A 'point of view changed' decision procedure 859 determines whether the point-of-view is to be changed from the current point-of-view. If the point-of-view does not change, a 'transform portion' procedure 861 transforms a portion of the received video frame containing the area-of-interest to remove distortions. Once the data representing the area-of-interest for the point-of-view of the camera is generated, a 'generate undistorted video frame' procedure 863 then packages the undistorted data into a standard video frame. A 'present video frame' procedure 865 then presents the undistorted image in the video frame by (for example, but without limitation) displaying the frame, storing the frame, transmitting the frame, and/or providing the frame as part of a video stream as video output to a video input).

However, if at the 'point of view changed' decision procedure 859 the point-of-view is to be changed (such as, by an operator using a control, by an automatic tracking process or procedure), the video creation process 850 continues to a 'select different camera video stream' procedure 867 that selects a stationary camera that substantially matches the desired point-of-view. In the case where the stationary cameras 205 are connected by a network (for example Ethernet, or optical fiber) this selection can occur by sending commands to the prior camera to stop sending video frames and sending a command to the different camera to start sending frames. If both cameras are attached to a multiplexing device, the commands can be sent to that device. Once the different camera is selected, the video creation process 850 continues to an 'update area-of-interest' procedure 869 that updates the information used for the 'transform portion' procedure' 861 to keep the area-of-interest in the appropriate position in the transformed frame. Then, the video creation process 850 continues to the 'receive video frame' procedure 857 to wait for a frame from the newly selected stationary camera.

One skilled in the art will understand that there are many approaches other than that just described that can be taken to switch between stationary cameras.

Irrespective of whether the area-of-interest 103 has changed, the video creation process 800 continues to a 'receive video frame' procedure 809. At the 'receive video frame' procedure 809, the video processors that are processing the distorted video stream from the stationary cameras 205 receive a video frame containing a distorted image of the scene as viewed by the camera through its distorting lens.

Once the video frame containing the distorted image is received, a 'transform portion' procedure 811 transforms the portion of the distorted image that represents the area-of-interest 103 into a non-distorted image that is used by a 'generate undistorted video frame' procedure 813 to create a video frame. The 'transform portion' procedure 811 performs transformations that can include (for example) one or more of an unwarp transformation, a pan transformation, a tilt transformation, and/or a zoom transformation to select the portion of the distorted image that represents the area-of-interest 103 and to prepare the selected portion for presentation as a video frame representing an undistorted image of the area-of-interest 103. Other scaling or image processing steps can be added to this processing if desired.

Once the relevant undistorted video frames are made available by the 'generate undistorted video frame' procedure 813, a 'select/generate video frame per specified viewpoint' procedure 815 either selects which undistorted video frames are to be presented, or generates a new video frame using the information in the distorted or undistorted video frames and can also use model information of the scene as well (for example, but not limited to using techniques described by U.S. Pat. No. 5,745,126 and/or U.S. Pat. No. 5,850,352).

Once the video frame is available for presentation, a 'send video frame' procedure 817 sends the video frame for transmission, storage or display as is known in the art and the video creation process 800 continues to the 'determine area-of-interest' procedure 805 to process subsequent video frames. The video representation of the area-of-interest 103 using a viewer-specified viewpoint (or change of viewpoint) is thus produced. The stream of video frames from each camera can be used to create special effects (for example, but without limitation) the appearance of camera movement rotating around the area-of-interest 103 or appearance of camera movement in synchronization with the area-of-interest 103). In addition, a view path (as is subsequently described) can be defined and used to provide special effects using the video streams.

One skilled in the art will understand that the 'determine area-of-interest' procedure 805, the 'changed area-of-interest' decision procedure 806 and the 'communicate area-of-interest' procedure 807 can each be automatically performed as an independent thread-of-execution (possibly in a separate computer or other device) or can be performed with manual intervention.

One skilled in the art will understand that there exists a multitude of equivalent ways to implement the example processes shown by FIG. 8A and FIG. 8B and that these ways are also contemplated by the inventor.

FIG. 9 illustrates a wide-angle video frame 900 that contains a warped image that results from capturing light from a scene through a distorting lens. The circular image of the scene captured by the distorting lens was positioned on the image sensor such that portions of the image were truncated (similar to that shown in FIG. 4C). One will notice that the straight lines in the scene are captured as distorted lines 901 in the resulting distorted image. A portion of the wide-angle video frame 900 has been designated as the source of a selected view 903 (subsequently described with respect to FIG. 10). One skilled in the art will understand the selected view 903 can be positioned by an operator within the wide-angle video frame 900 to select different views from the same distorted image. The selected view 903 can be indicated as a rectangle approximating the portion of the wide-angle video frame 900 that is selected, or can be indicated as a distorted rectangle that is a substantially accurate representation of the portion of the wide-angle video frame 900 that is selected. One skilled in the art will understand that other methods of indicating the selected view 903 can be used. These include (but are not limited to) using three-dimensional effects, watermark effects, etc.

One skilled in the art will understand that the distorting lens can be a wide-angle lens, a fisheye lens, a catadioptric lens or other distorting lens (although the catadioptric lens will produce an annular or partial annular image instead of a circular image). Furthermore, such a one will understand that even a wide-angle rectilinear lens still has some distortion that is not able to be corrected and thus falls within the ambience of a distorting lens. In addition to using wide-angle lenses, the invention can be useful when using non-distorting lenses to capture the area-of-interest (for example, by zooming in to the area-of-interest).

Figure 10:
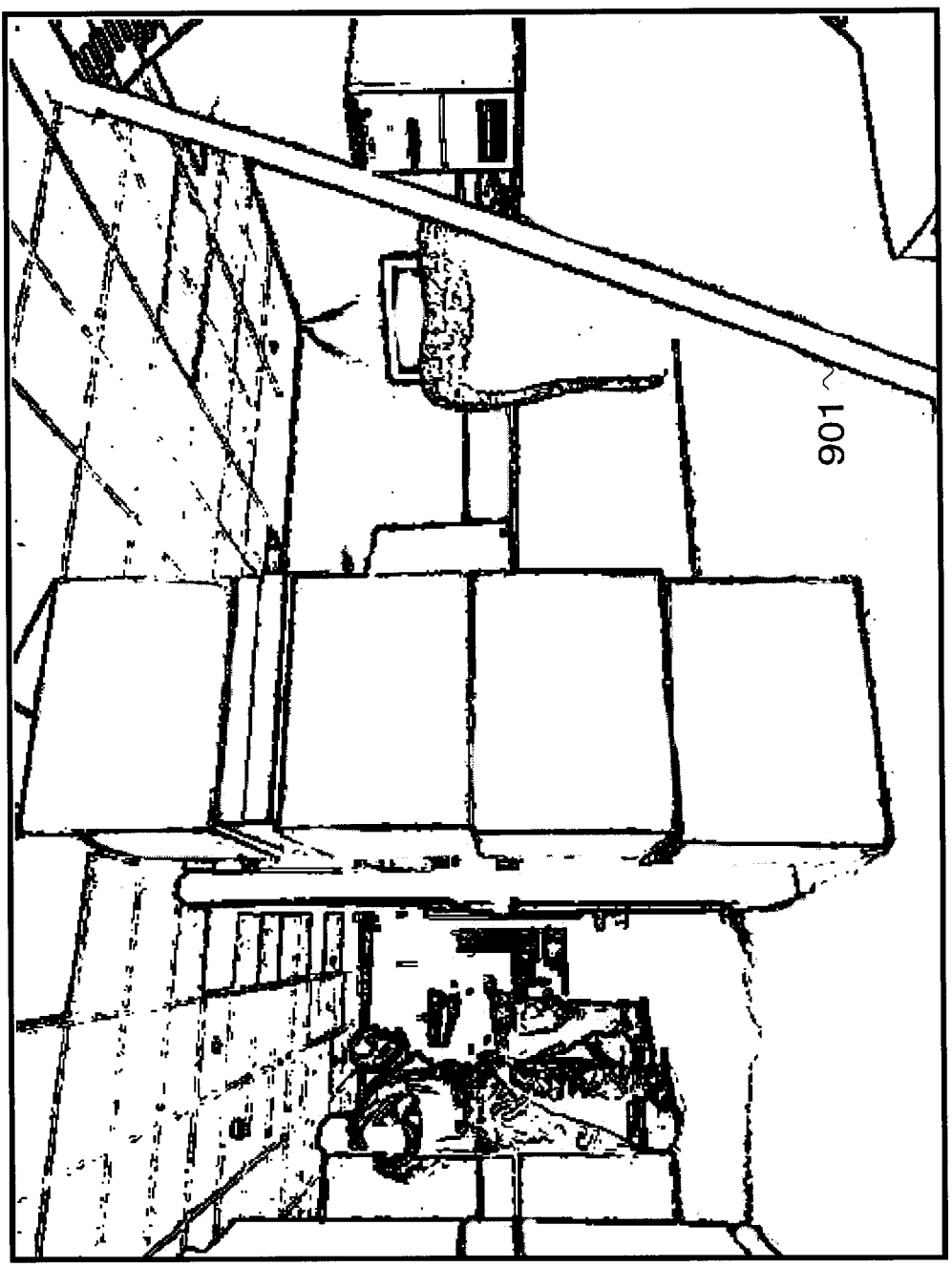
FIG. 10 illustrates a perspective-corrected view frame selected from the wide-angle video frame of FIG. 9 in accordance with a preferred embodiment.

FIG. 10 illustrates a perspective-corrected view frame 1000 that was transformed from the selected view 903 in the wide-angle video frame 900 of FIG. 9. In this perspective-corrected view, the displayed portions of the distorted lines 901 are again straight.

Figure 11A:
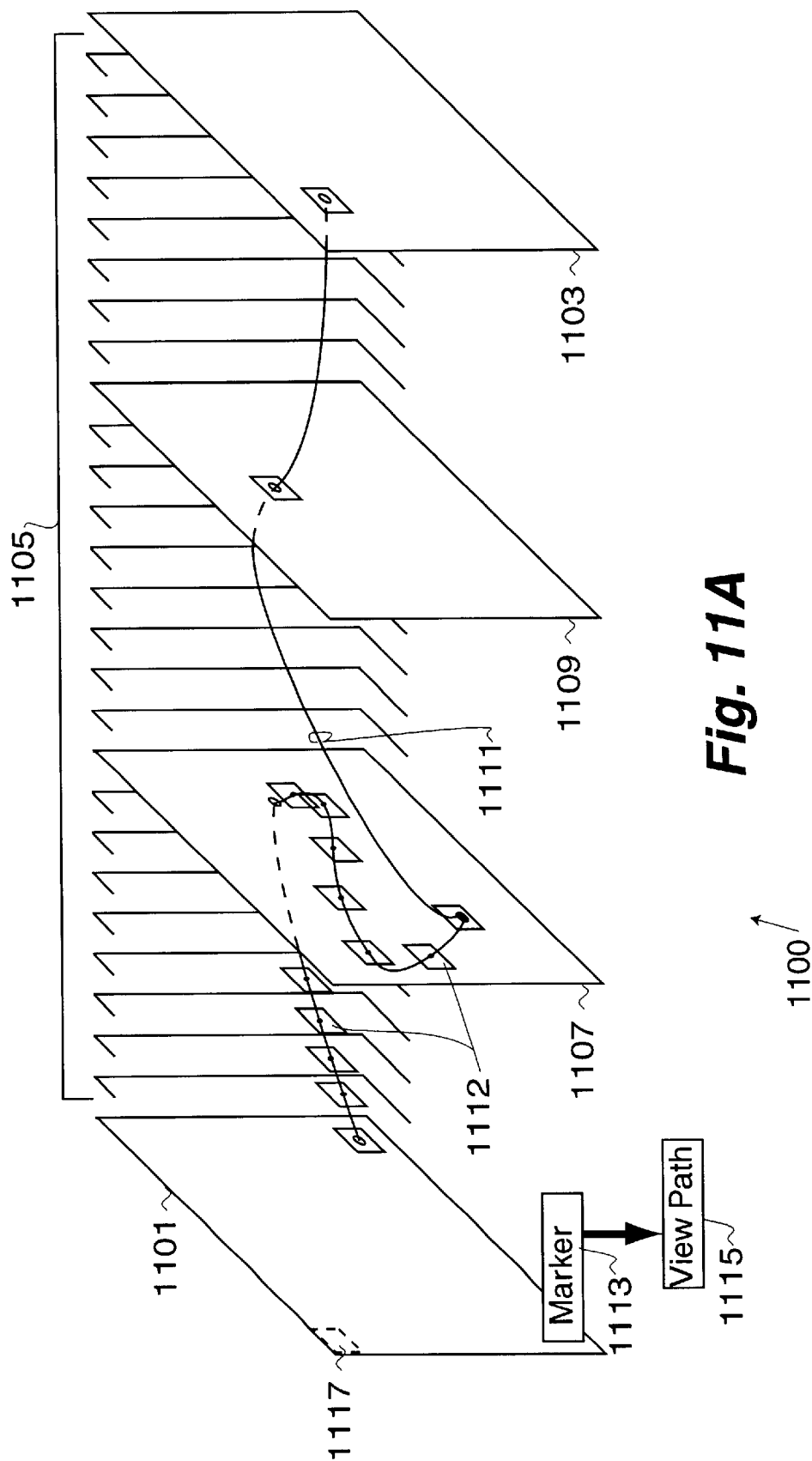
FIG. 11A illustrates a view path through a wide-angle video segment in accordance with a preferred embodiment.

FIG. 11A illustrates a wide-angle video segment 1100 identified by a start frame 1101 and an end frame 1103. The end frame 1103 can be specified by an operator, or can be the last available frame. Between the start frame 1101 and the end frame 1103 are intervening frames 1105. The start frame 1101, a ninth intervening frame 1107, an eighteenth intervening frame 1109, and the end frame 1103 are fully expanded. The other frames are indicated by an edge. In a video, a sequence of frames is captured over time. In FIG. 11A, capture-time starts at the start frame 1101 and increases towards the end frame 1103.

Each of the frames contains a distorted image of a scene captured through a distorting lens. The distorting lens can be, for example, a wide-angle lens, a fisheye lens, a catoptrical lens or other lens. The characteristics of distorted image have been described with respect to FIG. 9 and FIG. 10.

FIG. 11A also shows a view path 1111 that defines what portion of the wide-angle video segment 1100 is to be presented. During presentation, time increases from the start of the view path 1111 to the end of the view path 1111. For example, in prior art terms, if a video is initially played forwards then a portion of the previously viewed video is played backwards and then forward again, the "view path" defines a presentation-time that is a folding in the capture-time space of the video.

Only a presented portion 1112 of each frame is displayed because each frame of the wide-angle video segment 1100 contains more information than can be displayed in a non-distorted manner (see FIG. 9 and FIG. 10). This means that there can be a greater amount of significant information captured in a wide-angle video frame (for example, the ninth intervening frame 1107) than can be presented in a non-distorted manner. Thus, multiple non-distorted images can be presented out of a single wide-angle video frame. This concept is illustrated by discussing the view path 1111.

In this example, the view path 1111 starts at the start frame 1101 and causes the presented portion 1112 of the start frame 1101 to be accessed, unwarped and presented. This continues for each of the intervening frames 1105 until (for this example) the ninth intervening frame 1107 within which the view path "dwells" and from which a multiple of the presented portion 1112 is generated. Eventually, the view path 1111 exits the ninth intervening frame 1107 and eventually ends at the end frame 1103.

This generates a video stream where the display time can be roughly equivalent to the capture time until (in this example) that of the ninth intervening frame 1107. When the view path 1111 reaches the ninth intervening frame 1107, the capture-time stops (freezing the frame) while multiple images are presented out of the ninth intervening frame 1107. Thus, the view path dwells within the ninth intervening frame 1107 for some multiple of the display-time interval. Finally, subsequent of the intervening frames 1105 are entered by the view path 1111 and the presented portion 1112 for each is displayed.

This results in a video stream where time advances up to the ninth intervening frame 1107, then the motion of the objects in the wide-angle video frame stop, while the viewpoint moves within the field of view of the ninth intervening frame 1107 (producing the effect of a normal camera panning, tilting or zooming while the viewed scene is frozen in time), and then resuming time from the ninth intervening frame 1107 to the end frame 1103. In addition to the pan-tilt-zoom capabilities above, other capabilities can be added (for example, affine transformations).

The view path 1111 can also go backwards in capture-time to previously displayed frames. This includes having the view path 1111 be continuous as it traverses to earlier captured intervening frames, or by having the view path 1111 be discontinuous as it transitions to an earlier or later intervening frame. In a similar manner, the view path 1111 can forward skip some of the intervening frames 1105 to provide a fast-forward effect (skipping every "N" frames), or provide an instant queuing function to jump from one portion of the video segment to another portion of the video segment.

In addition, the view path 1111 can include one or more delay characteristics that allow pause of the display-time for a specified amount of real-time.

The start frame 1101 can be associated with a marker 1113 that associates a view path data structure 1115 with the start frame 1101. The view path data structure 1115 can contain information that defines the view path 1111 through the wide-angle video segment 1100. In some embodiments, an intraframe storage area 1117 is used to store a portion (or all) of the view path data structure 1115. However, the view path data structure 1115 can be stored separately from the wide-angle video segment 1100 (for example, in a file that is identified by the marker 1113). The marker can also include information about the camera's relationship to the scene. In particular, the position of the camera and the field of view of the camera (including the tilt of the camera).

Some preferred embodiments use "keyframes" that have a particular view position, time and duration for each keyframe. In these embodiments, the view path is generated by interpolating from one keyframe to another. This interpolation can be a linear, b-spline, or other interpolation. The duration allows the view path to dwell at the keyframe for the specified time.

One skilled in the art will also understand that a preferred embodiment also supports providing views from multiple independent or intersecting view paths. The resulting video stream can be provided to prior art video devices for separate video mixing or special effects (for example, picture-in-picture).

The presented portion 1112 of the wide-angle video frame can be specified by a viewing vector into the wide-angle video frame. This viewing vector can be defined from pan, tilt, and zoom coordinates into the wide-angle video frame. Thus, the view path 1111 can be considered as a four-space comprising pan, tilt, zoom and time coordinates. One skilled in the art will understand that, like the time coordinate, change in the pan, tilt, and zoom coordinates need not be contagious or limited to smoothly changing.

In one preferred embodiment, the display-time need not be equivalent to the capture-time. In this embodiment, the presented portion 1112 is extrapolated from one or more of the preceding frames and one or more of the successive frames (in capture-time), and with respect to the desired display-time.

Figure 11B:
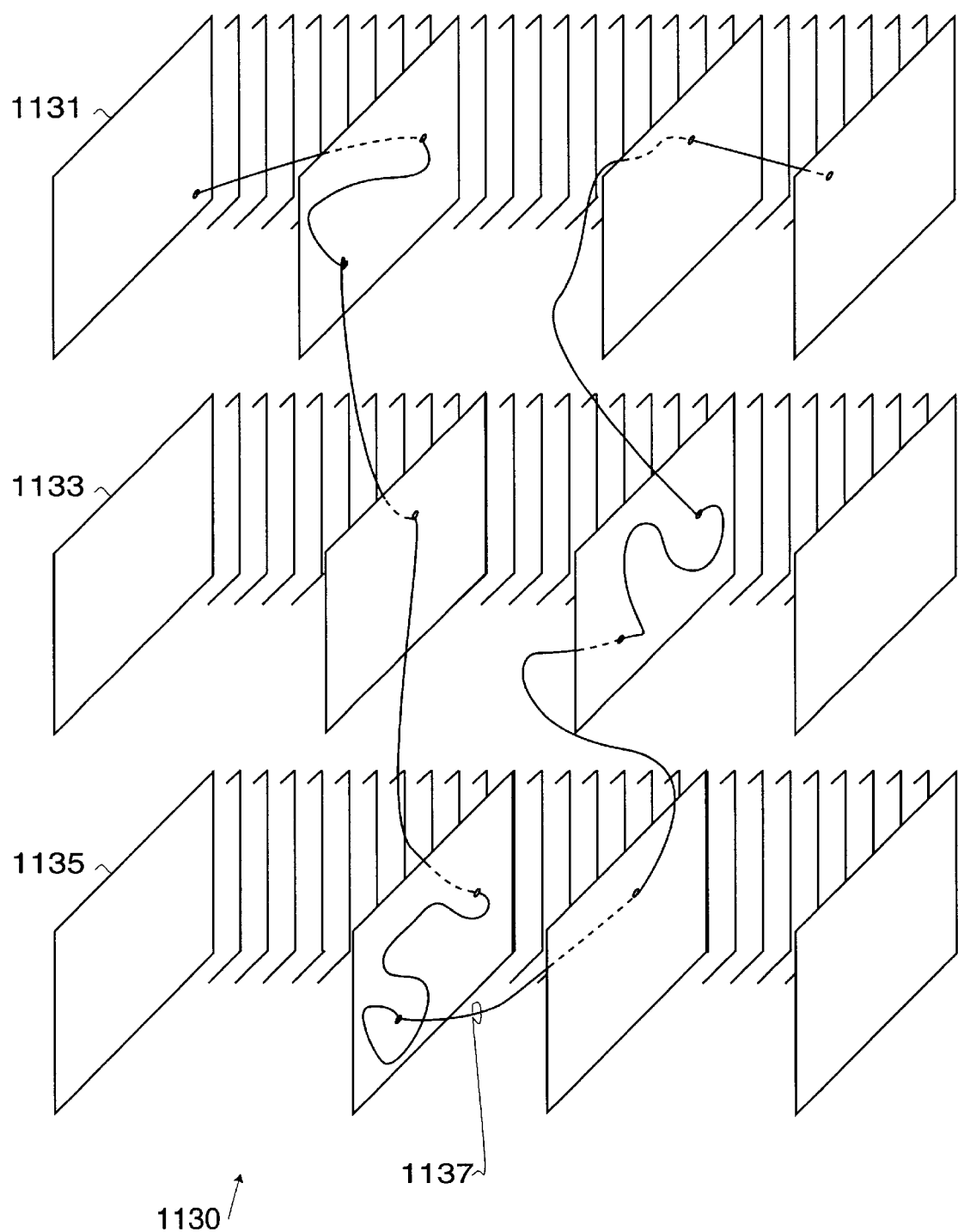
FIG. 11B illustrates a view path through multiple wide-angle video segments in accordance with a preferred embodiment.

FIG. 11B illustrates a multi-segment view path example 1130 including a first segment 1131, a second segment 1133, a third segment 1135 and a view path 1137 that extends across each of the segments. The different segments can be from the same camera at different capture-times, from different cameras at substantially the same capture-time, or some combination of these. If the segments are taken from different cameras at substantially the same capture-time and the view path 1137 extends across these segments, the resultant video containing the presented portions can mimic the movement of a camera as if the camera was moving from the position of the camera that captured the first segment to the camera that captured the last segment. In addition, the view path 1137 need traverse between adjacent cameras but can also traverse between non-adjacent cameras and/or times to generate special effects.

The different segments can be synchronized such that the frames of each were captured at substantially the same time. In addition, to synchronize segments that were not synchronized when they were captured, frames can be extrapolated from adjacent frames to provide pseudo-frames that match the desired synchronization.

Thus, when dwelling within a frame, the view path 1137 provides pan, tilt, and/or zoom effects as compared to when traversing between segments that were captured during substantially the same capture-time that provides effects that simulate that of a moving camera. One skilled in the art will understand that pan, tilt and zoom effects can also be applied to traverses between segments.

One skilled in the art will understand that the wide-angle video frames can be standard television frames generated by a camera outfitted with a wide-angle lens, a fish-eye lens, a catadioptric lens, or other distorting lens.

The view path 1111 can be associated with the wide-angle video segment 1100 by storing the information that describes the view path 1111 either within the wide-angle video frames, in a separate file, by defining said parameterized path (for example, a b-spline), or by using other techniques.

The view path can be specified as a path of discrete points in the coordinate space, can be defined as a spline or B-spline in the coordinate space, or specified by other known methods of specifying a path through a coordinate space.

Figure 12:
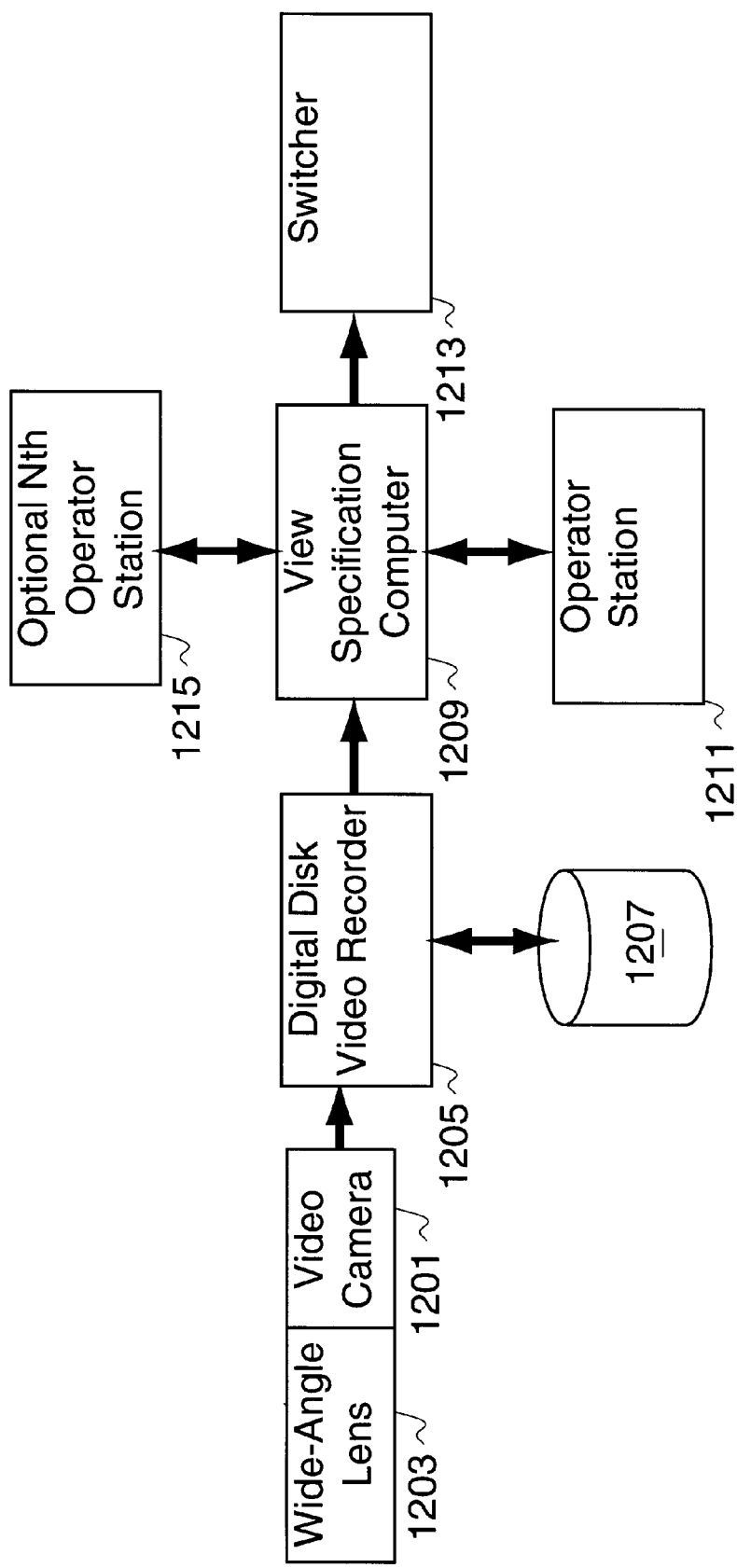
FIG. 12 illustrates an interactive view selection system in accordance with a preferred embodiment.

FIG. 12 illustrates an interactive view selection system 1200 that can be used to implement the previously described functionality. The interactive view selection system 1200 includes a video camera 1201 that receives an image of a scene through a wide-angle lens 1203, rectilinear lens or other distorting lens to generate a distorted video stream.

The distorted video stream is received at a Digital Disk Video Recorder (DDVR) 1205 where it is recorded and stored on a digital storage system 1207 of sufficiently high performance to reliably store the video stream. Once the video stream is stored, it can be retrieved for processing by a view-specification computer 1209. The view-specification computer 1209 can be controlled by an operator station 1211 that provides means for operator navigation through the video stream stored on the digital storage system 1207. In particular, the operator station 1211 provides a means to specify and/or alter a view path such as the view path 1111 through the video stream or a portion thereof.

The view-specification computer 1209 can generate a standard video stream for output by applying the view path to the wide-angle video stored on the digital storage system 1207. This output video can then be provided to prior art technology for processing (for example, to a switcher 1213 for broadcast studio processing, a video monitor, a video recording device, another computer etc.).

An optional $N^{th}$ operator station 1215 can also be attached to the view-specification computer 1209 (or a second view-specification computer in communication with the DDVR 1205 (not shown) to allow multiple operators to display and/or edit the view path through the stored wide-angle video stream.

The operator station 1211 and the optional $N^{th}$ operator station 1215 provide controls for specifying and/or altering the view path(s) through the video stream(s). These controls include those for specifying pan, tilt, and zoom coordinates as well as means for specifying frame rates in display-time and for selecting and pausing wide-angle video frames in capture-time. These controls can utilize such devices as touch panels, mice, joysticks, trackballs, dials, touch sensitive controls, keyboard commands, etc.

Some preferred embodiments include means for designating a video segment within the video stream. A video segment includes a first frame, a last frame and intervening frames. Other embodiments treat the entire recorded video stream as the video segment.

The interactive view selection system 1200 can be used to specify a view path through the video segment(s) for later presentation. It can also be used interactively. Thus, for example, a sports commentator can view the wide-angle video and control which portion of the wide-angle video is to be broadcast by selecting that portion using a touch screen and zoom control while at the same time providing commentary on what is being shown. Thus, the commentator is not solely dependent on the video footage captured by narrow field of view cameras.

Another way to use the interactive view selection system 1200 is to have a preliminary view path created at the optional $N^{th}$ operator station 1215 for playback by the commentator. During the playback, the commentator can alter the view path as desired.

One skilled in the art will understand that with the view-specification computer 1209, the DDVR 1205, and the digital storage system 1207 can be configured to be separate or combined devices. Such a one will understand that the video stream is comprised of frames or data that can represent frames (such as a MPEG video stream that defines the images).

Figure 13:
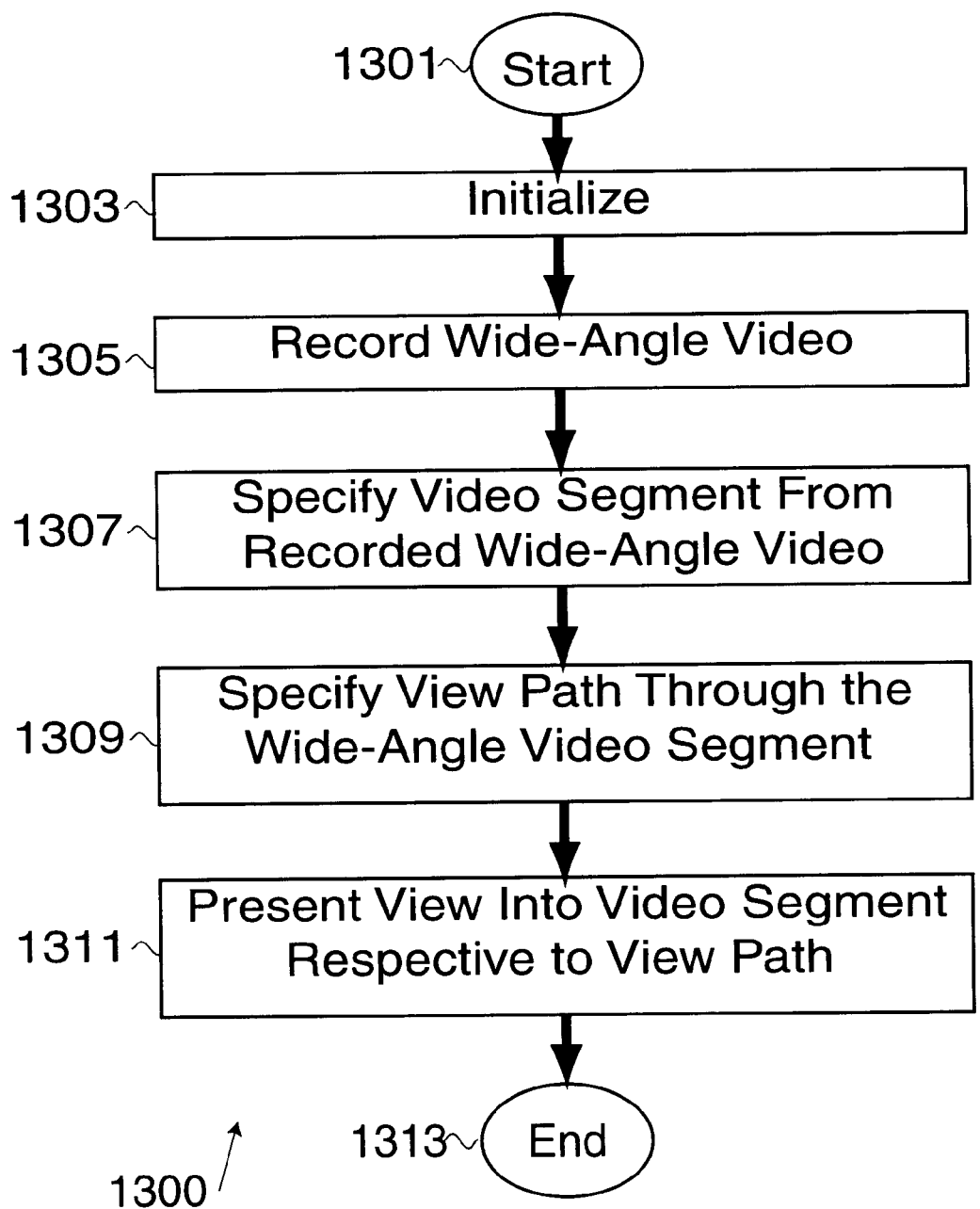
FIG. 13 illustrates an overview of the operation of the view selection system illustrated in FIG. 12 in accordance with a preferred embodiment.

FIG. 13 illustrates a view selection process 1300 that provides an overview of the operation of the interactive view selection system 1200 discussed in FIG. 12. The view selection process 1300 initiates at a 'start' terminal 1301 and continues to an 'initialization' process 1303 that performs any initialization required by the view selection process 1300 to be able to receive and record a video signal. Once the view selection process 1300 is initialized, a 'record wide-angle video' process 1305 receives the wide-angle video signal and records it to a high-speed, random-access, storage device (for example, a random access magnetic disk) that has sufficient performance to be able to keep up with the video stream. The wide-angle video frames can be stored using the DDVR 1205.

A 'specify video segment' process 1307 allows an operator to specify the start frame for the segment as is subsequently described with respect to FIG. 14. Once the segment is specified, a 'specify view path' process 1309 allows an operator to view the wide-angle video frames, and to specify the view path through the available segments.

A 'present view into video segment with respect to view path' process 1311 generates a view into the wide-angle video as specified by the view path specified by the 'specify view path' process 1309 and presents the generated view. A commentator or other operator can also change or amend the view path defined by the 'specify view path' process 1309 while the view path images are being presented. After the view path is presented (or if the operator terminates presentation) the view selection process 1300 terminates at an 'end' terminal 1313.

The recorded video signal can be received directly from a digital video camera, a HDTV video camera, an analog video camera coupled to a digitizer, a DVD player, a CD player, a video tape player, a HDTV playback device or other video or HDTV video source.

The 'record wide-angle video' process 1305 need not terminate prior to initiation of the 'specify video segment' process 1307. This allows for an open-ended recording of the wide-angle video stream.

The video segment can be automatically designated in some embodiments by designating the entirety of the distorted video stream as the video segment, by selecting a specified amount of past-recorded distorted video as the video segment, or by using other techniques known to one skilled in the art.

Figure 14:
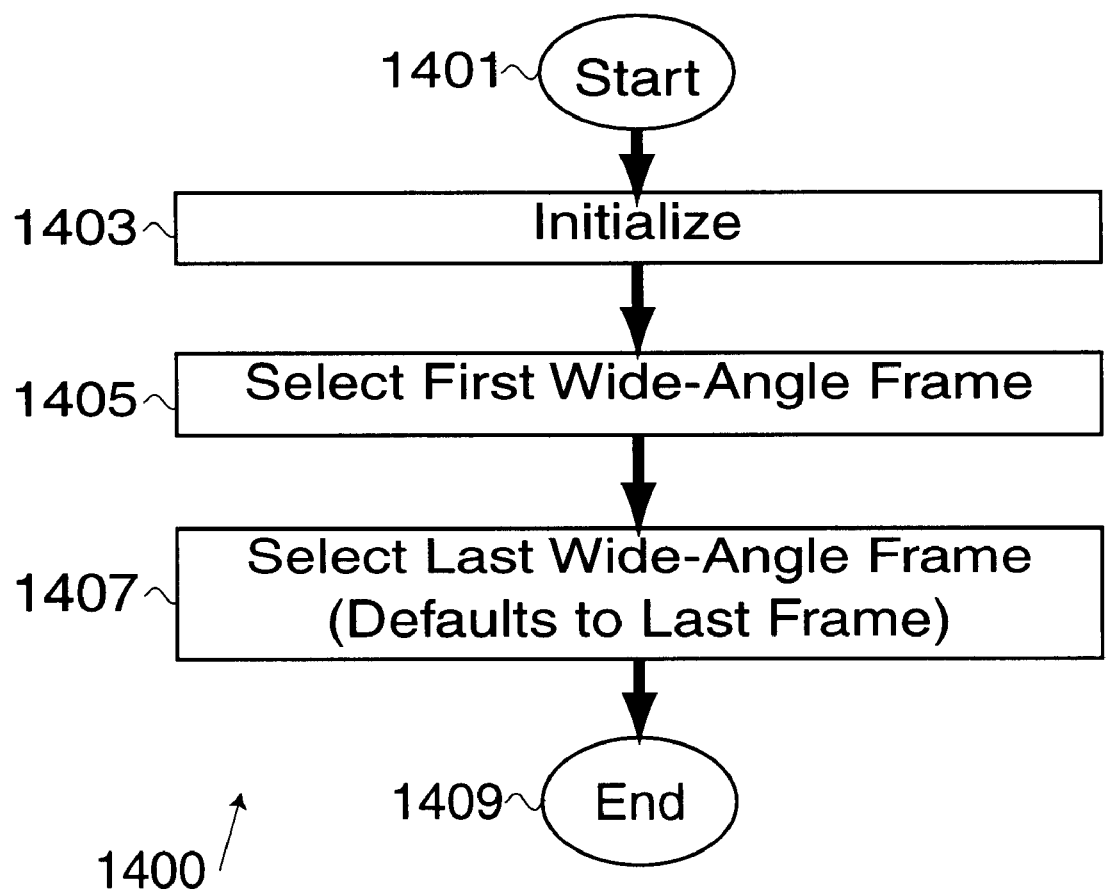
FIG. 14 illustrates a 'select video segment' process in accordance with a preferred embodiment.

FIG. 14 illustrates a 'select video segment' procedure 1400 that initiates at a 'start' terminal 1401 and is invoked by the 'specify video segment' process 1307. The 'select video segment' procedure 1400 is initialized at an 'initialization' procedure 1403 that performs any required initialization (such as opening files, allocating memory, etc.). Once initialized, the 'select video segment' procedure 1400 continues to a 'select first wide-angle frame' procedure 1405 that allows an operator or commentator to select which of the recorded wide-angle video frames is to be designated as the start of the segment. Next, a 'select last wide-angle frame' procedure 1407 allows the operator/commentator to specify the last wide-angle video frame in the segment. If a last frame is not specified by the operator, the 'select last wide-angle frame' procedure 1407 defaults to the last wide-angle video that is recorded. When continuous recording is used, the operator can also specify that the last frame be the last frame that was recorded (thus, the segment can be open-ended with no fixed end-frame). The 'select video segment' procedure 1400 terminates through an 'end' terminal 1409.

Figure 15A:
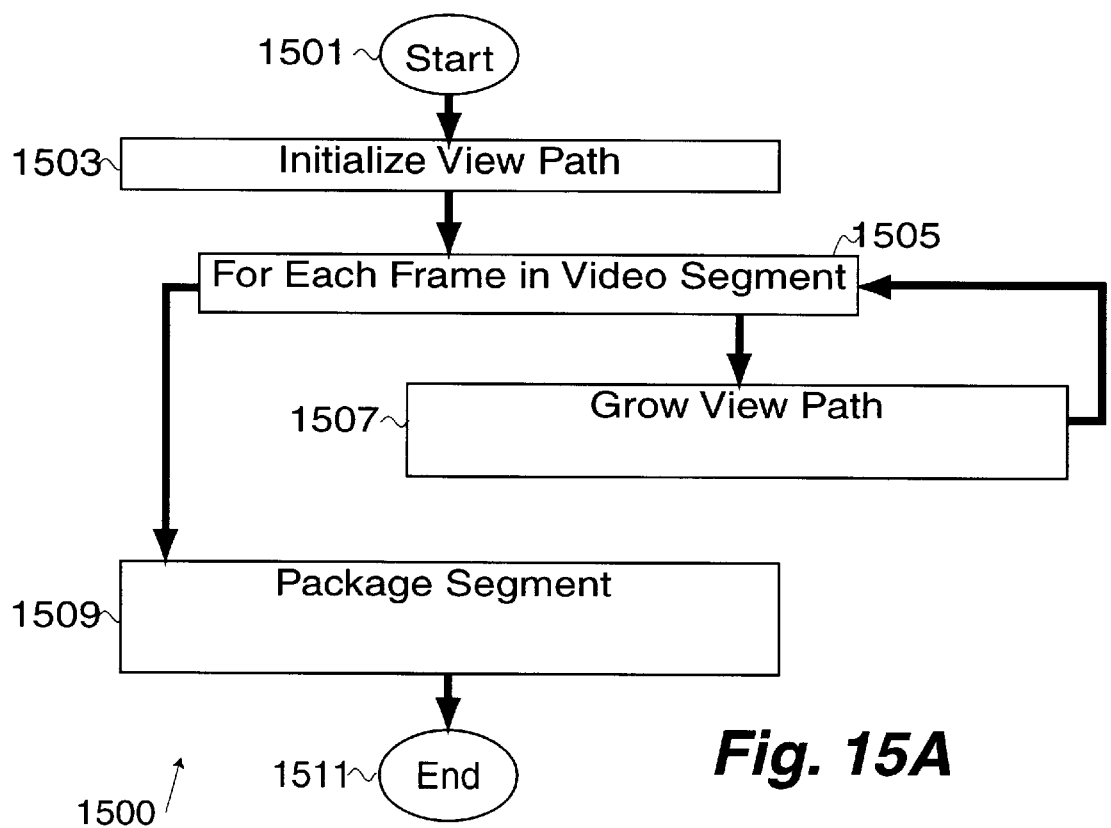
FIG. 15A illustrates a 'specify view path' process in accordance with a preferred embodiment.

FIG. 15A illustrates a specify view path procedure 1500 that is invoked by the 'specify view path' process 1309 of FIG. 13 and that initiates at a 'start' terminal 1501. An initialize view path' procedure 1503 initializes the view path data structure, specifies the marker with the first frame of the segment, initializes the operator controls and display, prepares to access the first frame of the segment, and prepares to accept operator input. A 'wide-angle video frame iteration' procedure 1505 iterates and presents each wide-angle video frame in the segment (although the 'wide-angle video frame iteration' procedure 1505 can also terminate responsive to an operator command. A typical way the wide-angle video frame is presented is by display of the wide-angle video on a monitor. For each iterated frame, a 'grow view path' procedure 1507 receives the operator's input used to specify the view path and adjusts the view path data structure 1115 accordingly. After the segment is presented and the view path data structure 1115 is defined, a 'package segment' procedure 1509 associates the view path data structure 1115 with the marker 1113 on the first frame of the segment. The specify view path procedure 1500 returns through an 'end' terminal 1511.

Figure 15B:
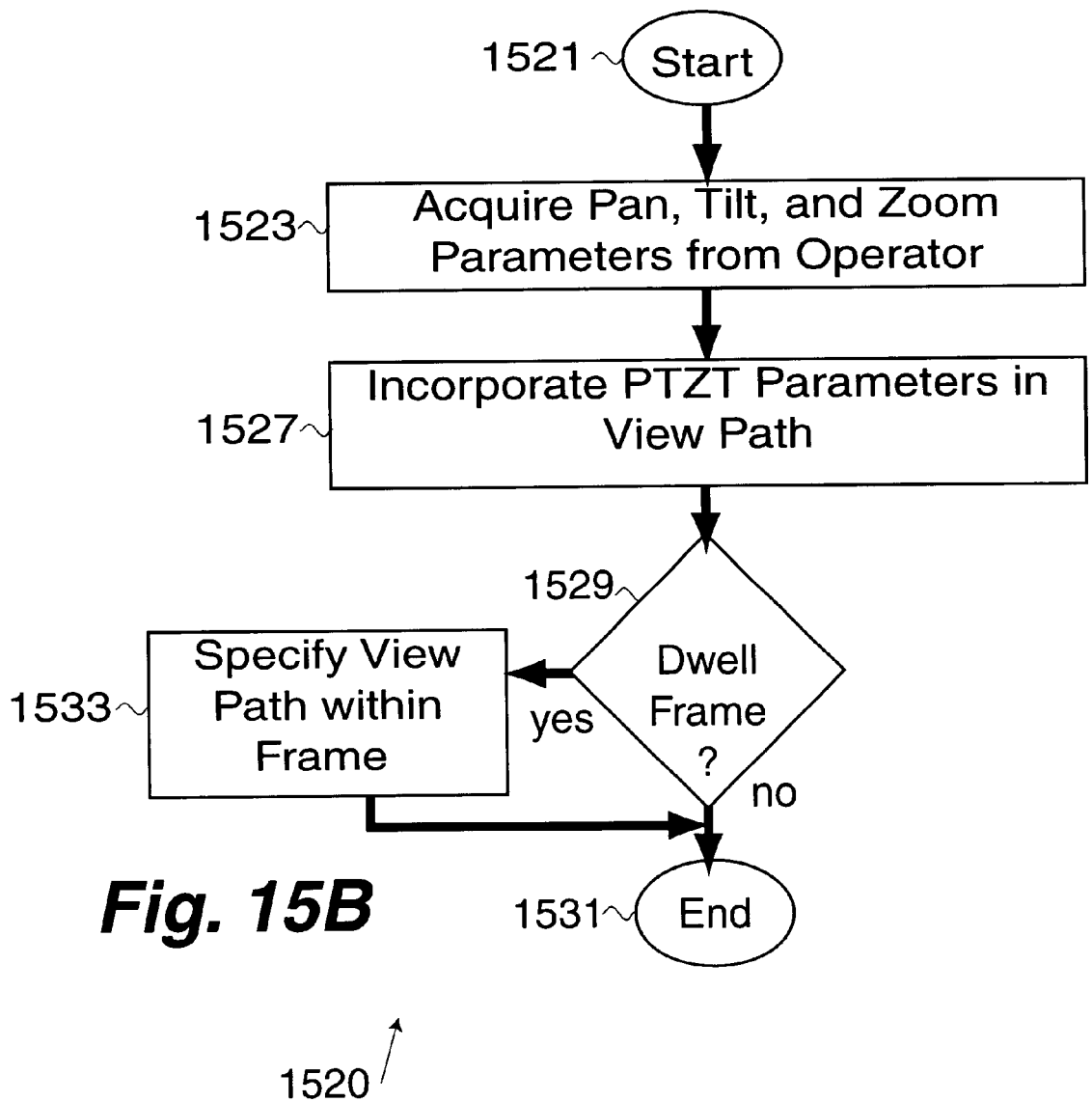
FIG. 15B illustrates a 'grow view path' process in accordance with a preferred embodiment.

FIG. 15B illustrates a 'grow view path' procedure 1520 invoked by the 'grow view path' procedure 1507 of FIG. 15A and that initiates at a 'start' terminal 1521. The PTZ parameters are obtained from the operator/commentator by an 'acquire PTZ parameters' procedure 1523 that reads the parameters from the operator's controls at the operator station 1211 (for example, a touch screen to provide the tilt and pan parameters and a slide handle (for example, similar to a fade control) to provide the zoom parameter). The parameters acquired by the 'acquire PTZ parameters' procedure 1523 are then associated with the view path frame in display-time (or in capture-time depending on the embodiment) by an 'incorporate PTZ into view path' procedure 1527. The PTZ coordinates can also include the display-time coordinate (PTZT). One skilled in the art will understand that the PTZ coordinates do not need to be directly stored in the view path data structure 1115 so long as the view path defined by the view path data structure 1115 substantially matches the PTZ coordinates specified by the operator. Thus, the view path can be a parameterized path such as a B-spline or other similar path defining function.

Next, a 'dwell wide-angle video frame' decision procedure 1529 determines whether the operator desires to dwell within the current wide-angle video frame. If not, the 'grow view path' procedure 1520 returns through an 'end' terminal 1531. Otherwise, the 'grow view path' procedure 1520 continues to a 'specify view path within wide-angle video frame' procedure 1533 as is subsequently described with respect to FIG. 15C and then returns through the 'end' terminal 1531.

The operator can determine to dwell within a particular wide-angle video frame by pressing a button or activating some other operator selectable control to pause the playback of the wide-angle video frame. The operator can also specify a particular frame by identifying the specific frame, by jogging to a specific frame, by returning to a marked frame or bookmarked frame or by using any other mechanism to specify a particular frame from the recorded wide-angle video stream. In addition, the operator can bookmark a frame viewed in real time for later selection.

In one preferred embodiment, the operator need not specify a view path for playback, but can specify the view into wide-angle video frame in real-time such that the selected view is presented in real-time and is responsive to the operator.

Figure 15C:
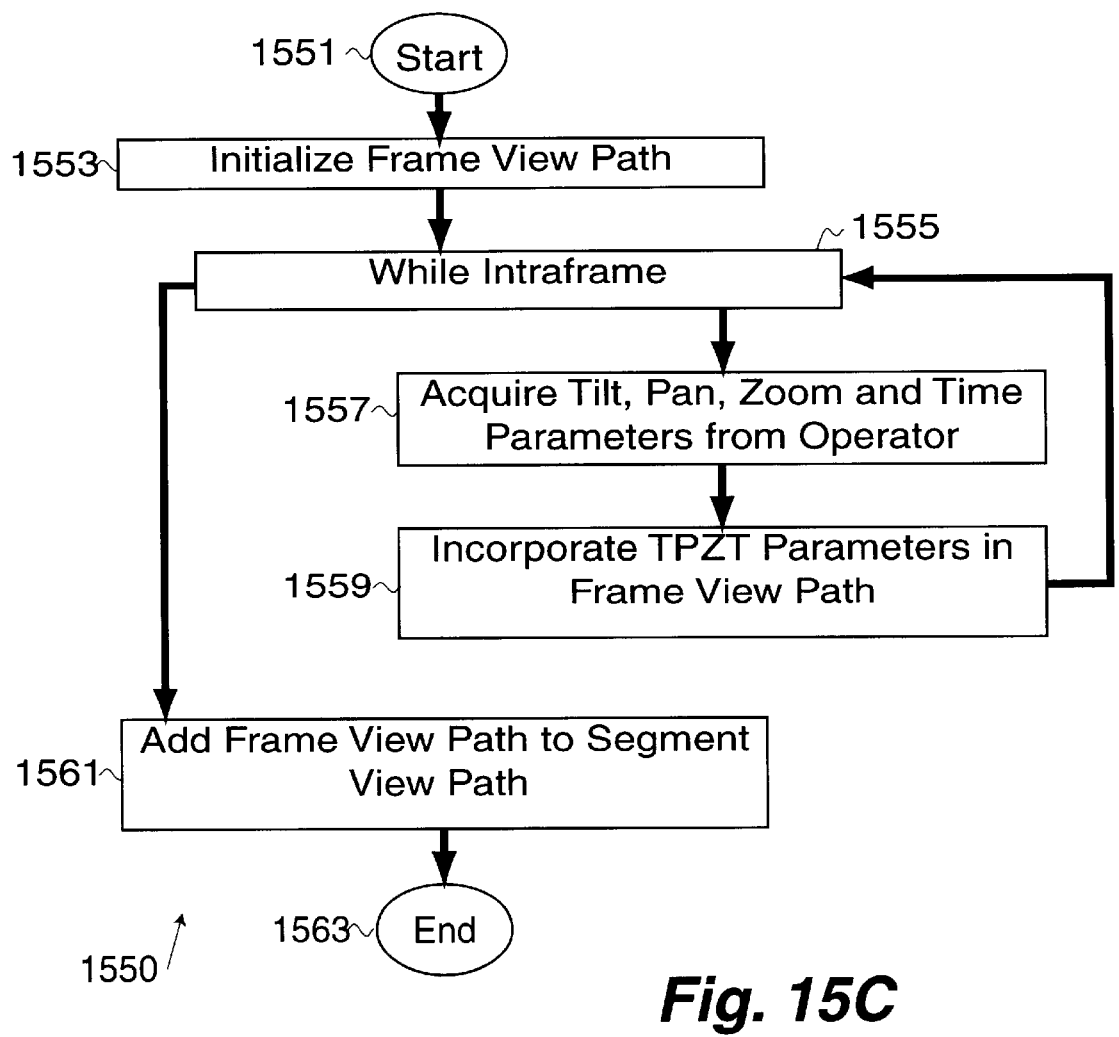
FIG. 15C illustrates a 'specify view path through wide-angle video frame' process in accordance with a preferred embodiment.

FIG. 15C illustrates a specify intraframe view path 1550 that initiates at a 'start' terminal 1551 and is invoked by the 'specify view path within wide-angle video frame' procedure 1533 of FIG. 15B. The specify intraframe view path 1550 continues to an 'initialize frame view path' procedure 1553 that prepares the view path for incorporation of the intraframe path.

Next, a 'while intraframe' iteration procedure 1555 determines when an operator desires to no longer dwell within the wide-angle video frame. While the operator dwells within the wide-angle video frame, the specify intraframe view path 1550 continues to an 'acquire PTZ and display-time' procedure 1557 that accesses the operator's controls to obtain the pan, tilt, and zoom parameters. In addition, the display-time parameter is determined. The display-time parameter is generally inferred from the previous capture-time interval, but can be specified by the operator if so desired either directly or indirectly as a function of a video effect. Once the PTZT parameters are acquired, an 'incorporate PTZT into view path' procedure 1559 modifies the frame view path to incorporate the new PTZT parameters. Then the specify intraframe view path 1550 returns to the 'while intraframe' iteration procedure 1555 to continue adding additional views.

Once the operator indicates that he/she no longer desires to dwell within the wide-angle video frame, the specify intraframe view path 1550 continues to an 'add frame view path to segment view path' procedure 1561 that incorporates the frame view path with the segment view path and the specify intraframe view path 1550 returns through an 'end' terminal 1563.

One skilled in the art will understand that there are many ways to add the intraframe view path to the segment view path. These include directly adding the intraframe coordinates to an existing view path, creating an intraframe view path and appending the intraframe view path to the segment view path, linking the intraframe view path to the associated wide-angle video frame and other well understood mechanisms.

Figure 16:
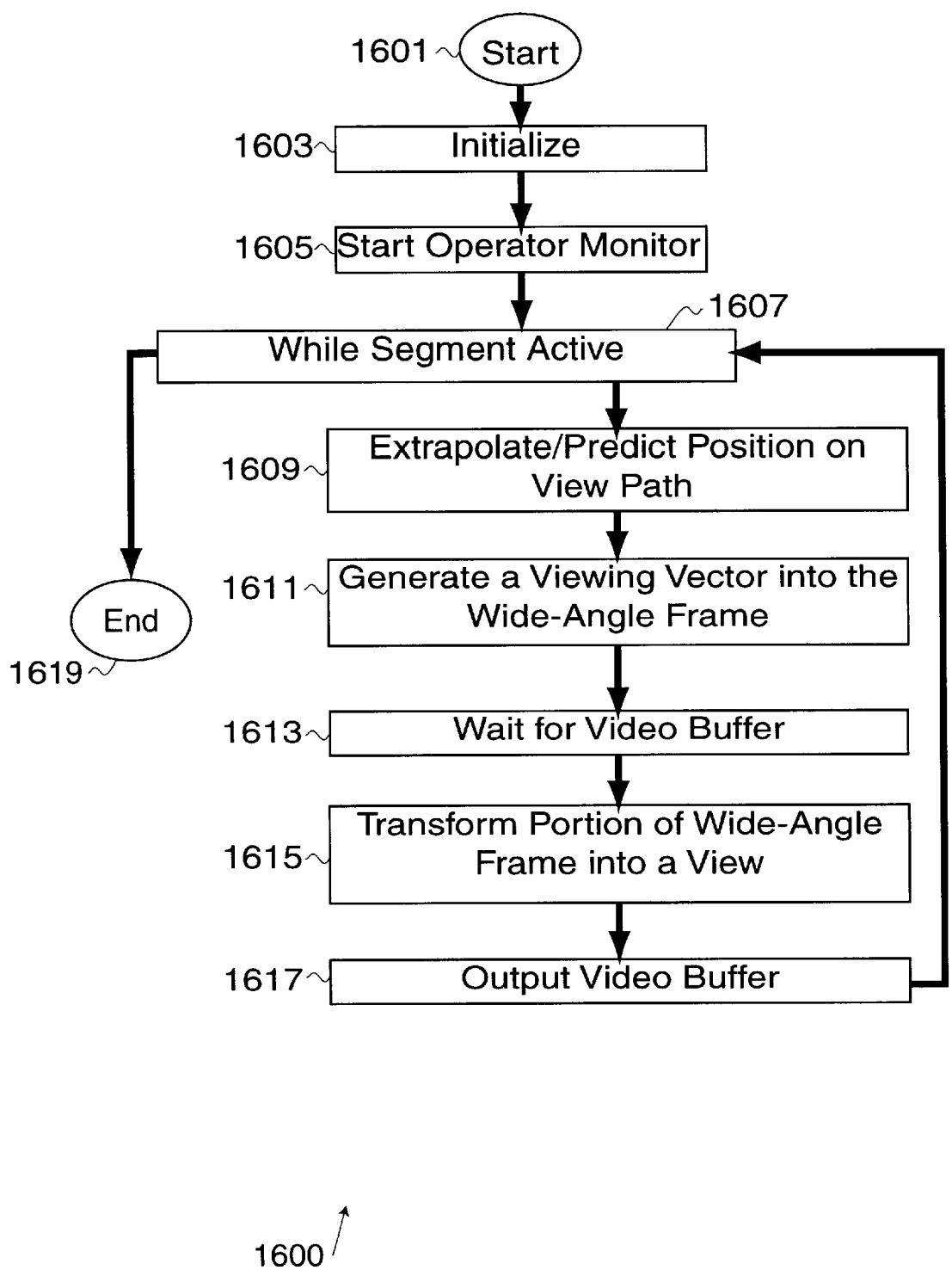
FIG. 16 illustrates a video segment viewing process in accordance with a preferred embodiment.

FIG. 16 illustrates a video segment viewing process 1600 that initiates at a 'start' terminal 1601 and continues to an 'initialize' procedure 1603. The 'initialize' procedure 1603 performs any initialization required to access the display and/or to access the digital storage system 1207, the output to the switcher 1213 and other system facilities. The 'initialize' procedure 1603 also opens the view path and locates the associated recorded wide-angle video frame. A 'start operator monitor' procedure 1605 initiates the operator monitor that is subsequently described with respect to FIG. 17. Next, a 'while segment is active' procedure 1607 determines whether the playback of the view path is complete. If the playback of the view path is not complete, the video segment viewing process 1600 continues to an 'interpolate/predict position on view path' procedure 1609 that can determine the display-time and locate the corresponding wide-angle video frame in capture-time.

In addition, the 'interpolate/predict position on view path' procedure 1609 can determine the display-time and interpolate a wide-angle video frame between capture-time intervals using one or more of the wide-angle video frames that bracket the interpolated wide-angle video frame (both within a video segment and across video segments).

Furthermore, the 'interpolate/predict position on view path' procedure 1609 can use a predictor to determine the display-time and predict the operator's next desired view selection. These predictive techniques include the use of a Kalman Filter, an infinite impulse response (IIR) filter, block matching filter, or other predictive techniques. These techniques help smooth the operator/computer interface by anticipating how the operator will navigate through the wide-angle video segment. The predictor can be applied to the history of the operator's selection of the view to predict where in the wide-angle video the operator appears to be moving to. This provides an improved user interface providing a relatively better "feel" to the user as compared to a non-predictive control. The predictor can be applied to input from a touch screen, joystick, mouse or other curser control device.

Once a wide-angle video frame is selected and/or created, a 'generate viewing vector into wide-angle video frame' procedure 1611 that uses the information in the view path to generate a viewing vector into the wide-angle video frame located/created by the 'interpolate/predict position on view path' procedure 1609. Once the viewing vector is generated, a 'wait for video buffer' procedure 1613 waits for a video buffer to become available. Once a video buffer becomes available, the video segment viewing process 1600 continues to a 'generate view' procedure 1615 that transforms (unwarps) the portion of the wide-angle video identified by the viewing vector into a view and makes that view available to the video buffer (using techniques well known in the art). Then an 'output video buffer' procedure 1617 makes the video buffer available to the video output device that presents the video frame represented by the video buffer to a video device such as a switcher 1213, display monitor, video recorder, etc.

Once the 'interpolate/predict position on view path' procedure 1609 finishes the view path, the video segment viewing process 1600 completes through an 'exit' terminal 1619.

One skilled in the art will understand that the view path can be changed while it is being presented. Thus, as shown with respect to FIG. 17, the operator can dynamically alter the view path while it is being presented. In addition, the predictive filters previously discussed can help anticipate such dynamic alterations.

Figure 17:
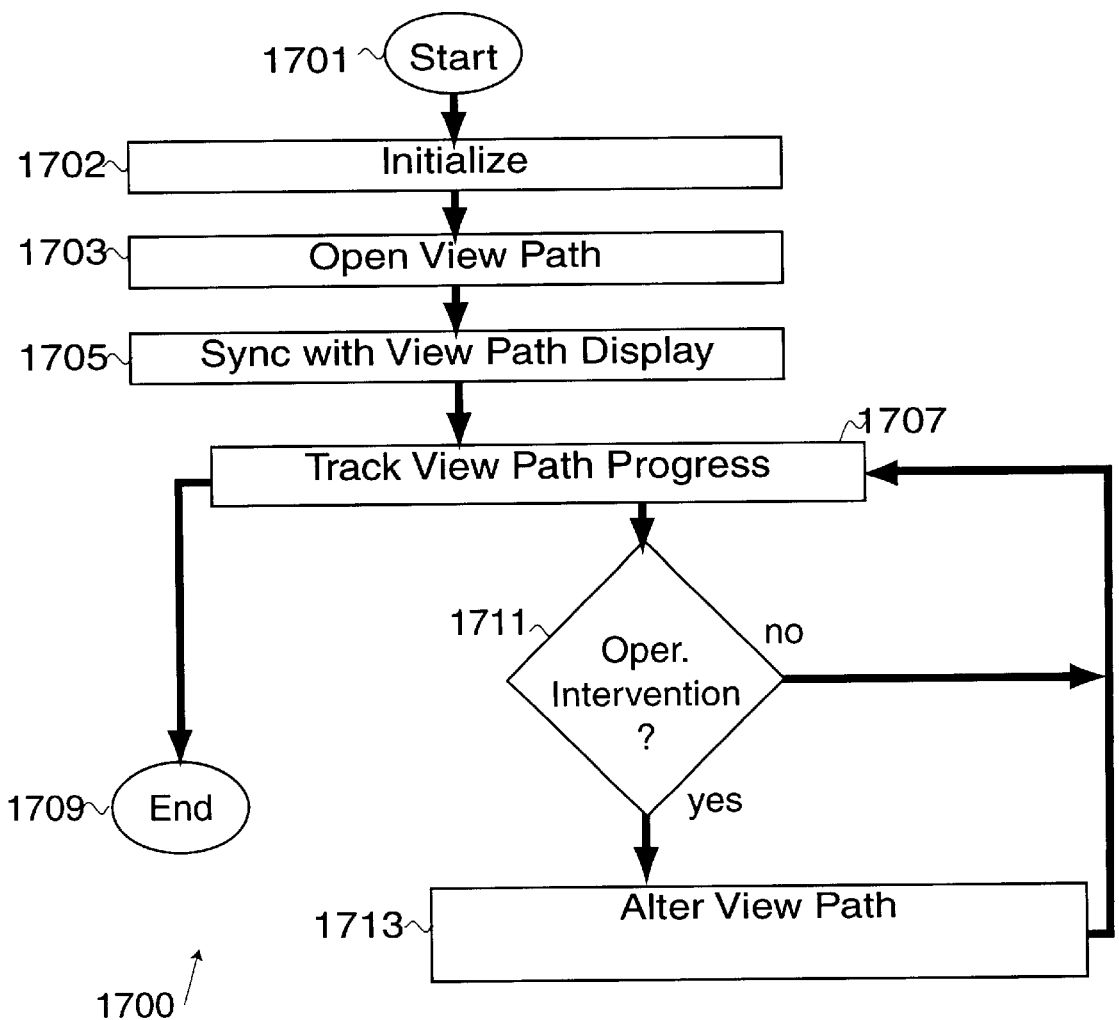
FIG. 17 illustrates a view path modification process in accordance with a preferred embodiment.

FIG. 17 illustrates a view path modification process 1700 that is invoked by the 'start operator monitor' procedure 1605 and that initiates at a 'start' terminal 1701. The view path modification process 1700 initializes at an 'initialize' procedure 1702 and continues to an 'open view path' procedure 1703 that opens the view path currently being presented to the operator. Then, a 'synchronize with view path display' procedure 1705 synchronizes, in display-time, with the wide-angle video frame (either the actual frame or an interpolated frame) from which the view is being generated.

Once synchronized, the view path modification process 1700 continues to a 'track view path progress' iterative procedure 1707 that maintains synchronization with the presented view in presentation-time. Thus, as the view path is traversed, the 'track view path progress' iterative procedure 1707 maintains a connection currently presenting portion of the view path. When the view path terminates, the view path modification process 1700 completes through an 'end' terminal 1709.

While the view path is being traversed, an 'operator intervention' decision procedure 1711 detects whether the operator desires to modify the existing view path by monitoring operator controls. If the operator does not want to modify the view path, the view path modification process 1700 loops back to the 'track view path progress' iterative procedure 1707. However, if the operator wants to modify the view path at the 'operator intervention' decision procedure 1711, the view path modification process 1700 continues to an 'alter view path' procedure 1713 that dynamically alters the view path using techniques similar to those described with respect to FIG. 15B, FIG. 15C and FIG. 16. Thus, the operator can dynamically alter the view path as the view path is being traversed and as the view is being presented.

In another preferred embodiment, one option available to the operator is to directly select the portion of the wide-angle video frame for display as the wide-angle video frame is received (that is without prior recording of the wide-angle video frame). Thus, the operator/commentator can select the view in real-time and not be limited by views captured by others.

One skilled in the art will understand that in some preferred embodiments, the display-time interval is the same as the capture-time interval.

In addition, one skilled in the art will understand that the claimed invention can be applied to digital video and high definition video.

One skilled in the art will understand that the procedures and processes previously described generally need not be performed exactly as shown, but that there are many equivalent procedures and processes that are contemplated by the inventor(s).

From the foregoing, it will be appreciated that the invention has (without limitation) the following advantages:

1) Ability to specify a view path through one or more video segments and thus provide for special video effects.
2) Ability for one to specify a view into a wide-angle video in real-time and to direct the resulting view into the video as desired.
3) Ability for one to dwell within a wide-angle video frame and to perform tilt, pan, and/or zoom operations on portions of the wide-angle frame to generate an unwarped video view into the wide-angle frame.
4) Predicts one's input into the wide-angle video and so provides a relatively more responsive user interface than a non-predictive input.

Other preferred embodiments can include multiple cameras with multiple distorting lenses, a mixture of distorting lenses and normal lenses, or instead of the video camera 1201 and the wide-angle lens 1203 combination, a distorted video stream input resulting from a multiple images stitched together or a computer generated distorted video stream.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein.

What is claimed is:

1. A method of:
    recording a video stream comprising a plurality of frames, wherein said plurality of frames define a plurality of distorted images;
    designating a portion of said video stream to be a video segment; and
    specifying a view path through said video segment.

2. The method of claim 1 wherein the step of designating said portion further comprises steps of:
    designating a first segment frame;
    designating a second segment frame; and
    including at least one intervening frame between said first segment frame and said second segment frame.

3. The method of claim 1 wherein said video segment is one of a plurality of video segments and said view path also extends through another of said plurality of video segments.

4. The method of claim 1 wherein the step of specifying said view path further comprises associating said view path with some of said plurality of frames.

5. The method of claim 4 wherein the step of associating further comprises steps of:
    presenting at least one of said plurality of frames;
    selecting a portion of said at least one of said plurality of frames as presented; and
    determining view information corresponding to said selected portion of said at least one of said plurality of frames, said view information comprising at least two coordinates selected from the set consisting of a pan coordinate, a tilt coordinate, a zoom coordinate and a time coordinate.

6. The method of claim 5 wherein the step of selecting further comprises a step of displaying a distorted-outline that indicates said portion as selected, whereby a user selecting said portion knows what is contained in said portion.

7. The method of claim 5 further comprising storing said view information within said at least one of said plurality of frames, said stored view information defining a location on said view path, said view path configured to specify how said view information into said plurality of frames changes throughout said video segment.

8. The method of claim 5 further comprising associating said view information with said at least one of said plurality of frames, said associated view information defining a location on said view path, said view path specifying how said view information into said plurality of frames changes throughout said video segment.

9. The method of claim 5 further comprising steps of:
    defining said view path as a parameterized path using said view information, said view path specifying how said view information into said plurality of frames changes throughout said video segment; and
    storing parameters specifying said parameterized path.

10. The method of claim 9 wherein said parameterized path is defined by a B-spline.

11. The method of claim 1 further comprising presenting a view into said video segment, said view corresponding to said view path.

12. The method of claim 11 further comprising dynamically altering said view path during presentation of said view, said view presentation correspondingly altered.

13. The method of claim 11 further comprising predicting alterations in said view path during presentation of said view.

14. The method of claim 13 wherein the step of predicting uses a predictor.

15. The method of claim 14 wherein said predictor is selected from the group consisting of an infinite impulse response filter, a kalman filter, and a block matching filter.

16. The method of claim 11 wherein the step of presenting further comprises steps of:
    generating a viewing vector into one of said plurality of distorted images responsive to said view path; and
    transforming a portion of said one of said plurality of distorted images responsive to said viewing vector to create said view.

17. The method of claim 11 wherein the step of presenting further comprises steps of:

generating a viewing vector into one of said plurality of frames responsive to said view path; and selecting a portion of said one of said plurality of frames responsive to said viewing vector to create said view.

18. A method of:

recording a video stream comprising a plurality of frames that define a plurality of distorted images;

designating a portion of said video stream to be a video segment;

specifying a view path through said video segment;

generating a viewing vector into one of said plurality of distorted images responsive to said view path;

transforming a portion of said one of said plurality of distorted images responsive to said viewing vector to create a view; and presenting said view.

19. An apparatus comprising:

a recording mechanism configured to record a video stream, said video stream comprising a plurality of frames;

a segment specification mechanism configured to designate a portion of said video stream to be a video segment; and a view path specification mechanism configured to specify a view path through said video segment designated by the segment specification mechanism.

20. The apparatus of claim 19 wherein the segment specification mechanism further comprises:

a first frame designation mechanism configured to designate a first segment frame; and a second frame designation mechanism configured to designate a second segment frame with at least one intervening frame between said first segment frame and said second segment frame.

21. The apparatus of claim 19 wherein said video segment is one of a plurality of video segments and said view path also extends through another of said plurality of video segments.

22. The apparatus of claim 19 wherein the view path specification mechanism further comprises an association mechanism configured to associate said view path with some of said plurality of frames.

23. The apparatus of claim 22 wherein the association mechanism further comprises:

a presentation mechanism configured to present at least one of said plurality of frames;

a view selection mechanism configured to select a portion of said at least one of said plurality of frames as presented by the presentation mechanism; and view information mechanism, responsive to the view selection mechanism, configured to determine view information corresponding to said selected portion of said at least one of said plurality of frames, said view information comprising at least two coordinates selected from the set consisting of a pan coordinate, a tilt coordinate, a zoom coordinate and a time coordinate.

24. The apparatus of claim 23 wherein the view information mechanism further comprises a selection display mechanism configured to display a distorted-outline that indicates said portion as selected, whereby a user selecting said portion knows what is contained in said portion.

25. The apparatus of claim 23 further comprising a storage mechanism configured to store said view information within said at least one of said plurality of frames, said stored view information defining a location on said view path, said view path configured to specify how said view information into said plurality of frames changes throughout said video segment.

26. The apparatus of claim 23 further comprising a storage mechanism configured to associate said view information with said at least one of said plurality of frames, said associated view information defining a location on said view path, said view path specifying how said view information into said plurality of frames changes throughout said video segment.

27. The apparatus of claim 23 further comprising:

a path determination mechanism configured to define said view path as a parameterized path using said view information, said view path specifying how said view information into said plurality of frames changes throughout said video segment; and a storage mechanism configured to store parameters specifying said parameterized path.

28. The apparatus of claim 27 wherein said parameterized path is defined by a B-spline.

29. The apparatus of claim 19 further comprising a presentation mechanism configured to present a view into said video segment, said view corresponding to said view path.

30. The apparatus of claim 29 further comprising an alter view path mechanism configured to dynamically alter said view path during presentation of said view, said view presentation correspondingly altered.

31. The apparatus of claim 29 further comprising a predictor configured to predict alterations in said view path during presentation of said view.

32. The apparatus of claim 31 wherein the predictor is selected from the group consisting of an infinite impulse response filter, a kalman filter, and a block matching filter.

33. The apparatus of claim 29 wherein the presentation mechanism further comprises:

a vector generator configured to generate a viewing vector into one of said plurality of distorted images responsive to said view path; and a transformation mechanism, responsive to the vector generator, configured to transform a portion of said one of said plurality of distorted images responsive to said viewing vector to create said view.

34. The apparatus of claim 29 wherein the presentation mechanism further comprises:

a vector generator configured to generate a viewing vector into one of said plurality of frames responsive to said view path; and a view selection mechanism configured to select a portion of said one of said plurality of frames responsive to said viewing vector to create said view.

35. An apparatus comprising:

a recording mechanism configured to record a video stream comprising a plurality of frames that define a plurality of distorted images;

a segment specification mechanism configured to designate a portion of said video stream to be a video segment;

a view path specification mechanism configured to specify a view path through said video segment specified by the segment specification mechanism;

a vector generator configured to generate a viewing vector into one of said plurality of distorted images responsive to said view path specified by the view path specification mechanism;
a transformation mechanism, responsive to the vector generator, configured to transform a portion of said one of said plurality of distorted images responsive to said viewing vector to create a view; and
a presentation mechanism, responsive to the transformation mechanism, configured to present a view into said video segment, said view corresponding to said view path.

36. A computer program product comprising:
a computer usable data carrier having computer readable code embodied therein for causing a computer to record a video stream, said computer readable code comprising:
computer readable program code configured to cause said computer to effect a recording mechanism configured to record said video stream, said video stream comprising a plurality of frames;
computer readable program code configured to cause said computer to effect a segment specification mechanism configured to designate a portion of said video stream to be a video segment; and
computer readable program code configured to cause said computer to effect a view path specification mechanism configured to specify a view path through said video segment designated by the segment specification mechanism.

37. The computer program product of claim 36 wherein the segment specification mechanism further comprises:
computer readable program code configured to cause said computer to effect a first frame designation mechanism configured to designate a first segment frame; and
computer readable program code configured to cause said computer to effect a second frame designation mechanism configured to designate a second segment frame with at least one intervening frame between said first segment frame and said second segment frame.

38. The computer program product of claim 36 wherein said video segment is one of a plurality of video segments and said view path also extends through another of said plurality of video segments.

39. The computer program product of claim 36 wherein the view path specification mechanism further comprises computer readable program code configured to cause said computer to effect an association mechanism configured to associate said view path with some of said plurality of frames.

40. The computer program product of claim 39 wherein the association mechanism further comprises:
computer readable program code configured to cause said computer to effect a presentation mechanism configured to present at least one of said plurality of frames;
computer readable program code configured to cause said computer to effect a view selection mechanism configured to select a portion of said at least one of said plurality of frames as presented by the presentation mechanism; and
computer readable program code configured to cause said computer to effect view information mechanism, responsive to the view selection mechanism, configured to determine view information corresponding to said selected portion of said at least one of said plurality of frames, said view information comprising at least two coordinates selected from the set consisting of a pan coordinate, a tilt coordinate, a zoom coordinate and a time coordinate.

41. The computer program product of claim 40 wherein the view information mechanism further comprises computer readable program code configured to cause said computer to effect a selection display mechanism configured to display a distorted-outline that indicates said portion as selected, whereby a user selecting said portion knows what is contained in said portion.

42. The computer program product of claim 40 further comprising computer readable program code configured to cause said computer to effect a storage mechanism configured to store said view information within said at least one of said plurality of frames, said stored view information defining a location on said view path, said view path configured to specify how said view information into said plurality of frames changes throughout said video segment.

43. The computer program product of claim 40 further comprising computer readable program code configured to cause said computer to effect a storage mechanism configured to associate said view information with said at least one of said plurality of frames, said associated view information defining a location on said view path, said view path specifying how said view information into said plurality of frames changes throughout said video segment.

44. The computer program product of claim 40 further comprising:
computer readable program code configured to cause said computer to effect a path determination mechanism configured to define said view path as a parameterized path using said view information, said view path specifying how said view information into said plurality of frames changes throughout said video segment; and
computer readable program code configured to cause said computer to effect a storage mechanism configured to store parameters specifying said parameterized path.

45. The computer program product of claim 44 wherein said parameterized path is defined by a B-spline.

46. The computer program product of claim 36 further comprising computer readable program code configured to cause said computer to effect a presentation mechanism configured to present a view into said video segment, said view corresponding to said view path.

47. The computer program product of claim 46 further comprising computer readable program code configured to cause said computer to effect an alter view path mechanism configured to dynamically alter said view path during presentation of said view, said view presentation correspondingly altered.

48. The computer program product of claim 46 further comprising computer readable program code configured to cause said computer to effect a predictor configured to predict alterations in said view path during presentation of said view.

49. The computer program product of claim 48 wherein the predictor is selected from the group consisting of an infinite impulse response filter, a kalman filter, and a block matching filter.

50. The computer program product of claim 46 wherein the presentation mechanism further comprises:
computer readable program code configured to cause said computer to effect a vector generator configured to generate a viewing vector into one of said plurality of distorted images responsive to said view path; and
computer readable program code configured to cause said computer to effect a transformation mechanism, responsive to the vector generator, configured to transform a portion of said one of said plurality of distorted images responsive to said viewing vector to create said view.

51. The computer program product of claim 46 wherein the presentation mechanism further comprises:
- computer readable program code configured to cause said computer to effect a vector generator configured to generate a viewing vector into one of said plurality of frames responsive to said view path; and
- computer readable program code configured to cause said computer to effect a view selection mechanism configured to select a portion of said one of said plurality of frames responsive to said viewing vector to create said view.

52. The computer program product of claim 36 wherein the computer usable data carrier is a computer readable media.

53. The computer program product of claim 36 wherein the computer usable data carrier is a carrier wave.

54. A computer program product comprising:
- a computer usable data carrier having computer readable code embodied therein for causing a computer to present a view from a video stream, said computer readable code comprising:
- computer readable program code configured to cause said computer to effect a recording mechanism configured to record said video stream comprising a plurality of frames that define a plurality of distorted images;
- computer readable program code configured to cause said computer to effect a segment specification mechanism configured to designate a portion of said video stream to be a video segment;
- computer readable program code configured to cause said computer to effect a view path specification mechanism configured to specify a view path through said video segment specified by the segment specification mechanism;
- computer readable program code configured to cause said computer to effect a vector generator configured to generate a viewing vector into one of said plurality of distorted images responsive to said view path specified by the view path specification mechanism;
- computer readable program code configured to cause said computer to effect a transformation mechanism, responsive to the vector generator, configured to transform a portion of said one of said plurality of distorted images responsive to said viewing vector to create said view; and
- computer readable program code configured to cause said computer to effect a presentation mechanism, responsive to the transformation mechanism, configured to present a view into said video segment, said view corresponding to said view path.

55. The computer program product of claim 54 wherein the computer usable data carrier is a computer readable media.

56. The computer program product of claim 54 wherein the computer usable data carrier is a carrier wave.

* * * * *